United States Patent
Kikuchi

(10) Patent No.: US 11,614,903 B2
(45) Date of Patent: Mar. 28, 2023

(54) INFORMATION PROCESSING APPARATUS FOR INDICATING A QUALITY REQUIREMENT FOR A PRODUCT

(71) Applicant: Canon Kabushiki Kaisha, Tokyo (JP)

(72) Inventor: Shou Kikuchi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/395,824

(22) Filed: Aug. 6, 2021

(65) Prior Publication Data

US 2022/0050644 A1 Feb. 17, 2022

(30) Foreign Application Priority Data

Aug. 14, 2020 (JP) .............................. JP2020-137026

(51) Int. Cl.
*G06F 3/12* (2006.01)

(52) U.S. Cl.
CPC .......... *G06F 3/1208* (2013.01); *G06F 3/1256* (2013.01); *G06F 3/1272* (2013.01); *G06F 3/1285* (2013.01); *G06F 3/1293* (2013.01)

(58) Field of Classification Search
CPC .... G06F 3/1208; G06F 3/1256; G06F 3/1272; G06F 3/1285
See application file for complete search history.

(56) References Cited

U.S. PATENT DOCUMENTS

| | | | | |
|---|---|---|---|---|
| 9,729,759 B1 * | 8/2017 | Robinson | ............ | H04N 1/6072 |
| 2009/0031235 A1 * | 1/2009 | Martin | ............... | G03G 15/5016 |
| | | | | 715/765 |
| 2009/0138878 A1 * | 5/2009 | Fernstrom | ............ | G06F 1/3284 |
| | | | | 718/102 |
| 2017/0344818 A1 * | 11/2017 | Yoshizumi | ............ | G06F 3/1286 |
| 2019/0260910 A1 * | 8/2019 | Maeda | ................. | H04N 1/6052 |
| 2020/0019353 A1 * | 1/2020 | Okajima | ................ | G06F 3/1257 |
| 2021/0149609 A1 * | 5/2021 | Kikuchi | ................ | G06F 3/1208 |
| 2021/0294541 A1 | 9/2021 | Yano | | |
| 2021/0294552 A1 | 9/2021 | Fujita et al. | | |

FOREIGN PATENT DOCUMENTS

JP  4881130  2/2012

OTHER PUBLICATIONS

Idealliance print quality exchange specification (Year: 2016).*
Hiroyuki Toriyabe, U.S. Appl. No. 17/416,787, filed Jun. 21, 2021.
Yuuki Maeda, U.S. Appl. No. 17/312,619, filed Jun. 10, 2021.

* cited by examiner

Primary Examiner — Benjamin O Dulaney
(74) Attorney, Agent, or Firm — Venable LLP

(57) ABSTRACT

An information processing apparatus acquires print data of a plurality of pages, generates quality requirement data including information indicating a quality requirement for a print product based on the print data in a data-by-data basis or in a page-by-page basis, and information for specifying whether the quality requirement is defined in the data-by-data basis or defined in the page-by-page basis, and transmits the print data and the quality requirement data to a printing service for a print request. The quality requirement data is a file in a PRX format, and the file in the PRX format stores, as CustomerItem, the quality requirement in the data-by-data basis or in the page-by-page basis.

17 Claims, 17 Drawing Sheets

F I G. 2
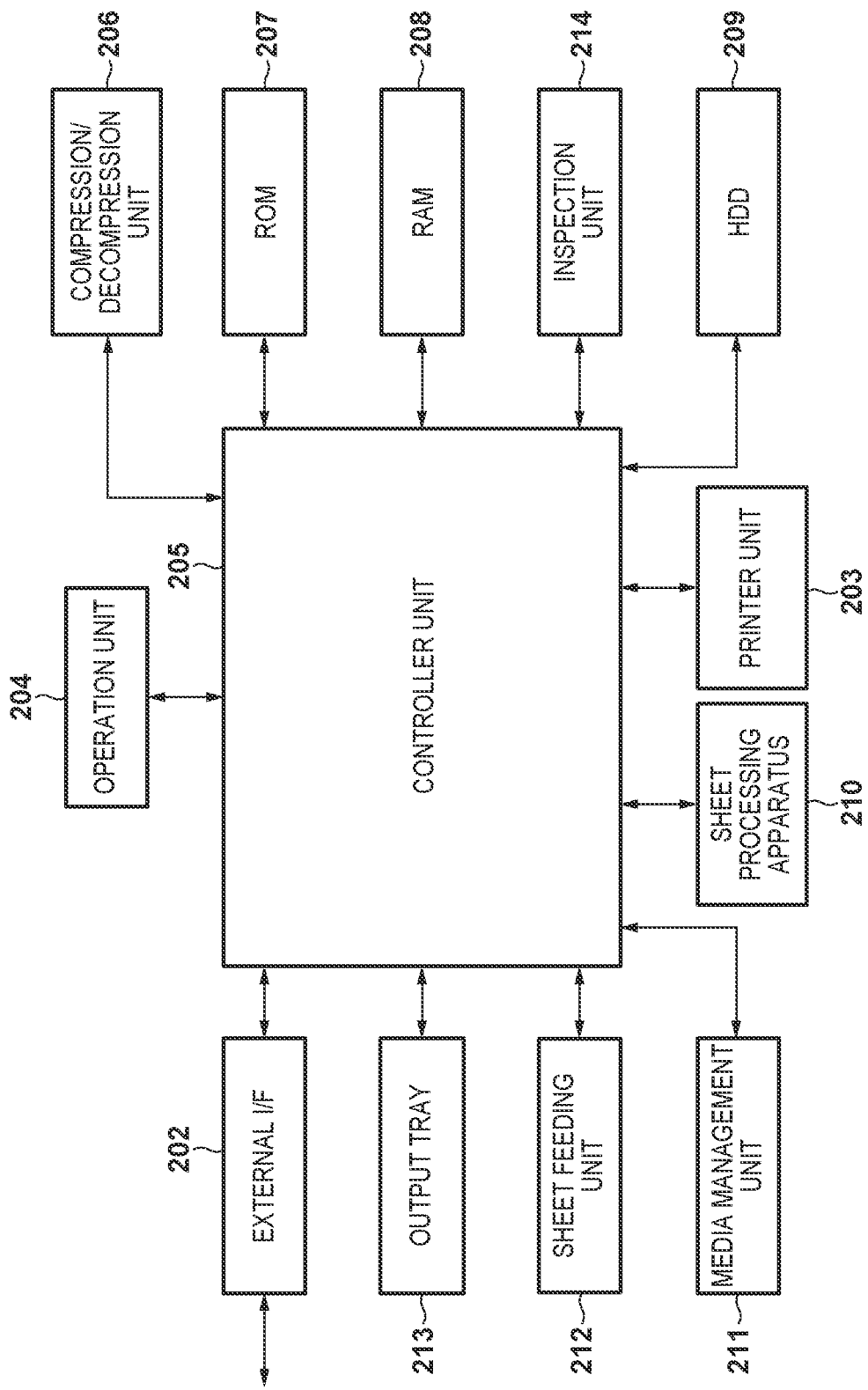

FIG. 4

| | |
|---|---|
| BOOT LOADER | 401 |
| OPERATING SYSTEM | 402 |
| NETWORK CONTROL PROGRAM | 403 |
| RECEPTION PROGRAM | 404 |
| TRANSMISSION PROGRAM | 405 |
| JDF FUNCTION PROGRAM | 406 |
| PDF FUNCTION PROGRAM | 407 |
| MEDIA MANAGEMENT PROGRAM | 408 |
| SHEET COUNT PROGRAM | 409 |
| INSPECTION PROGRAM | 410 |

FIG. 5

| | |
|---|---|
| BOOT LOADER | 501 |
| OPERATING SYSTEM | 502 |
| NETWORK CONTROL PROGRAM | 503 |
| WEB SERVER | 504 |
| WORKFLOW CONTROL PROGRAM | 505 |
| SUBMISSION SYSTEM PROGRAM | 506 |
| RECEPTION PROGRAM | 507 |
| TRANSMISSION PROGRAM | 508 |

FIG. 6

| | |
|---|---|
| BOOT LOADER | ~601 |
| OPERATING SYSTEM | ~602 |
| NETWORK CONTROL PROGRAM | ~603 |
| WEB BROWSER | ~604 |
| PDF CREATION PROGRAM | ~605 |
| PRX CREATION PROGRAM | ~606 |
| JDF CREATION PROGRAM | ~607 |
| TRANSMISSION PROGRAM | ~608 |
| RECEPTION PROGRAM | ~609 |

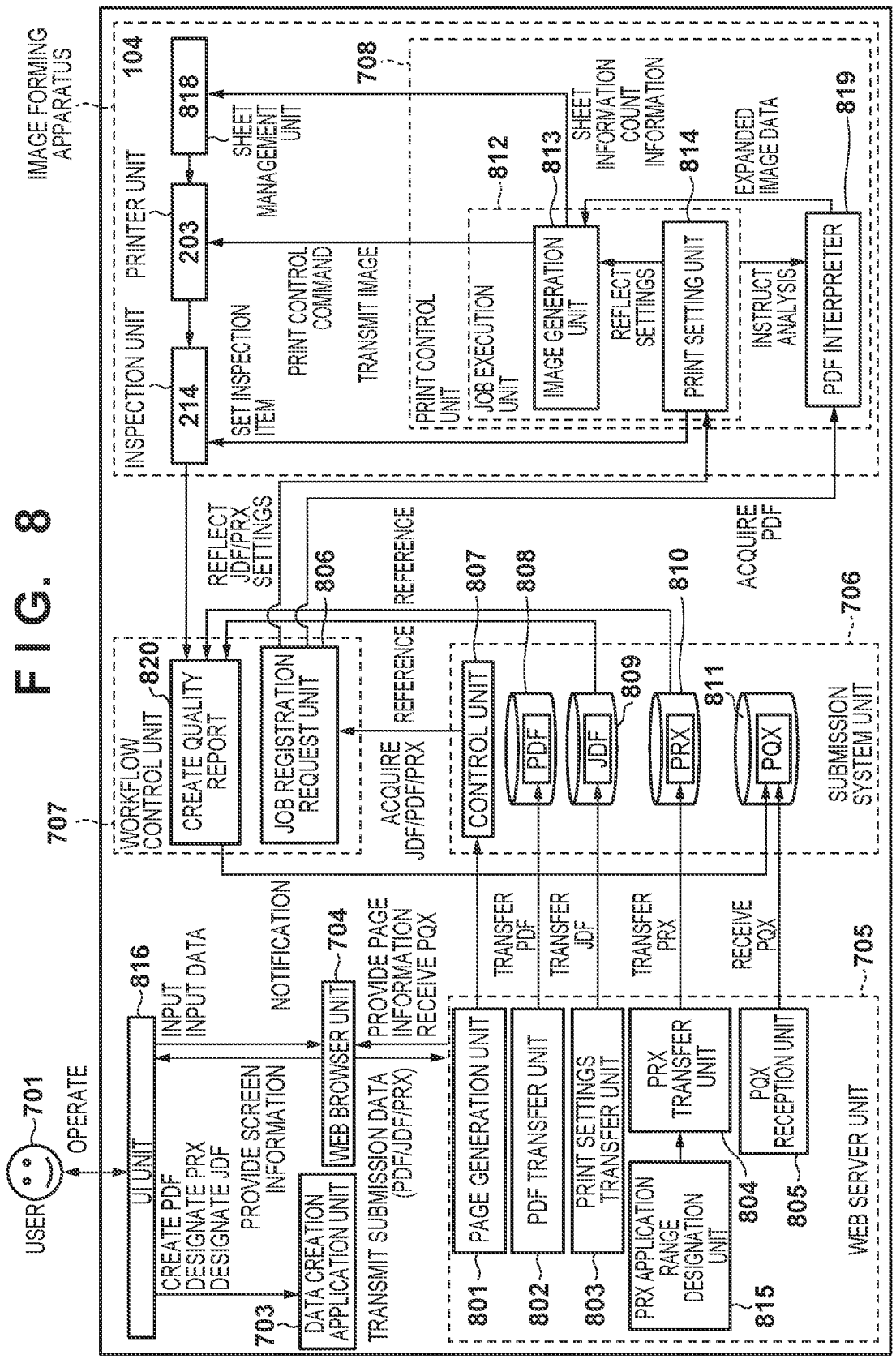

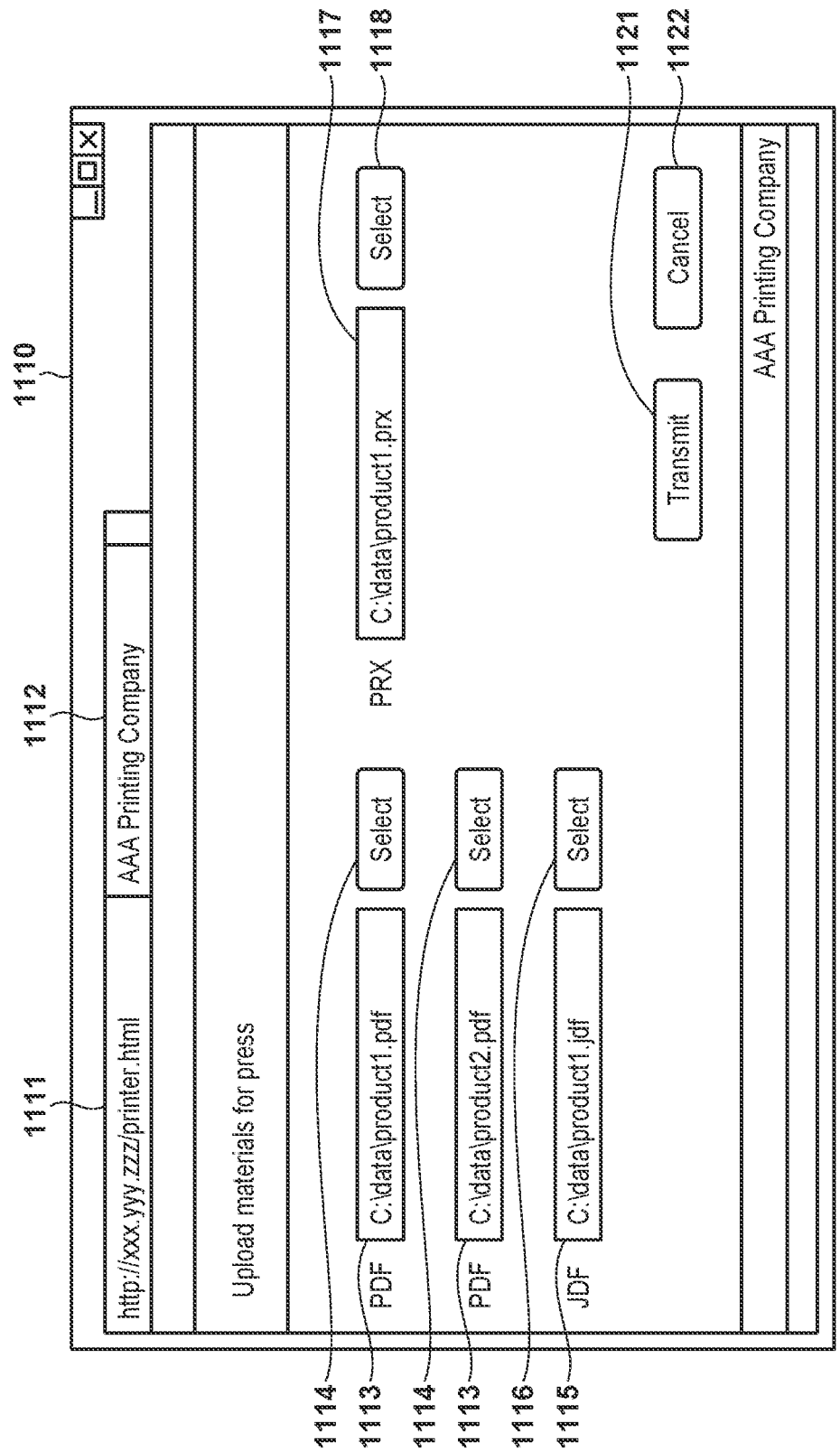

FIG. 12A

```
<PRX>
  <EvaluationInfo>
    </BasisofCalculation> ColorScore + RegistrationScore </BasisOfCalculation>
  </EvaluationInfo>
  <QualitySpecification>
        <QualitySpecName>PRX</QualitySpecName>
        <QualitySpecVersion>1.0</QualitySpecVersion>
        <CustomerItemUnit>File</CustomerItemUnit>  ~1201
        <CustomerItem>  ~1210
                <ID>xxxxxx1111xxxx1111</ID>  ~1211
                <QualityGoals>
                        <Color>
                        <ComplianceGoal>JapanColor dE (CIE DE2000)</ComplianceGoal>
                        <MinimumAcceptableRank>5</MinimumAcceptableRank>
                        <ColorScoringScale>
                                <ParameterScore Rank="7">
                                        <ValueRange> dE <= 2 </ValueRange>
                                </ParameterScore>
                                <ParameterScore Rank="6">
                                        <ValueRange> 2 < dE <= 3 </ValueRange>
                                </ParameterScore>
                                <ParameterScore Rank="5">
                                        <ValueRange> 3 < dE <= 5 </ValueRange>
                                </ParameterScore>
                        </ColorScoringScale>
                        </Color>
                </QualityGoals>
        </CustomerItem>
        <CustomerItem>  ~1220
                <ID>xxxxxx2222xxxx2222</ID>  ~1221
                <QualityGoals>
                        <Registration>
                                <MinimumAcceptableRank>6</MinimumAcceptableRank>
                                <RegistrationScoringScale>
                                        <ParameterScore Rank="8">
                                                <ValueRange> diff <= 1mm </ValueRange>
                                        </ParameterScore>
                                        <ParameterScore Rank="7">
                                                <ValueRange> 1mm < diff <= 2mm </ValueRange>
                                        </ParameterScore>
                                        <ParameterScore Rank="6">
                                                <ValueRange> 2mm < diff <= 4mm </ValueRange>
                                        </ParameterScore>
                                </RegistrationScoringScale>
                        </Registration>
                </QualityGoals>
        </CustomerItem>
  </QualitySpecification>
</PRX>
```

FIG. 12B

```xml
<PRX>
    <EvaluationInfo>
        </BasisofCalculation> ColorScore + RegistrationScore </BasisOfCalculation>
    </EvaluationInfo>
    <QualitySpecification>
        <QualitySpecName>PRX</QualitySpecName>
        <QualitySpecVersion>1.0</QualitySpecVersion>
        <CustomerItemUnit>Page</CustomerItemUnit>         ~1251
        <CustomerItem>
                <ID>xx11</ID>                             ~1260
                <QualityGoals>        ~1261
                        <Color>
                        <ComplianceGoal>JapanColor dE (CIE DE2000)</ComplianceGoal>
                        <MinimumAcceptableRank>5</MinimumAcceptableRank>
                        <ColorScoringScale>
                                <ParameterScore Rank="7">
                                        <ValueRange> dE <= 2 </ValueRange>
                                </ParameterScore>
                                <ParameterScore Rank="6">
                                        <ValueRange> 2 < dE <= 3 </ValueRange>
                                </ParameterScore>
                                <ParameterScore Rank="5">
                                        <ValueRange> 3 < dE <= 5 </ValueRange>
                                </ParameterScore>
                        </ColorScoringScale>
                        </Color>
                </QualityGoals>
        </CustomerItem>
        <CustomerItem>    ~1270
                <ID>yy22</ID>     ~1271
                <QualityGoals>
                        <Registration>
                                <MinimumAcceptableRank>6</MinimumAcceptableRank>
                                <RegistrationScoringScale>
                                        <ParameterScore Rank="8">
                                                <ValueRange> diff <= 1mm </ValueRange>
                                        </ParameterScore>
                                        <ParameterScore Rank="7">
                                                <ValueRange> 1mm < diff <= 2mm </ValueRange>
                                        </ParameterScore>
                                        <ParameterScore Rank="6">
                                                <ValueRange> 2mm < diff <= 4mm </ValueRange>
                                        </ParameterScore>
                                </RegistrationScoringScale>
                        </Registration>
                </QualityGoals>
        </CustomerItem>
    </QualitySpecification>
</PRX>
```

FIG. 15

INFORMATION PROCESSING APPARATUS FOR INDICATING A QUALITY REQUIREMENT FOR A PRODUCT

BACKGROUND OF THE INVENTION

Field of the Invention

The present invention relates to an information processing apparatus, a printing system, an information processing method, a printing method, and a storage medium and, more particularly, to quality inspection of a print product based on submitted data.

Description of the Related Art

In the commercial printing field, to electronically exchange information between a customer and a printing service, standards such as PQX/PRX (Print Quality eXchange, Print Request eXchange) and JDF (Job Definition Format) have been discussed. For example, Japanese Patent No. 4881130 discloses a method of submitting data to a printing service using JDF. When performing bookbinding or the like, special print settings may be used for a specific page. Japanese Patent No. 4881130 discloses a technique of matching such print settings determined in advance in a job ticket according to JDF with print contents.

On the other hand, according to PQX/PRX, processing of transmitting, by PRX, quality requirement for a print product required by a customer for a printing service and reporting the quality of a print product produced by the printing service to the customer by PQX is digitized. This allows the customer and the printing service to easily carry out activities for uniforming quality. Note that standardization of the PRX format and the PQX format as ISO-20616 has been examined.

SUMMARY OF THE INVENTION

According to an embodiment of the present invention, an information processing apparatus comprises at least one processor and at least one memory storing a program which is configured to cause the at least one processor to perform: acquiring print data of a plurality of pages; generating quality requirement data including information indicating a quality requirement for a print product based on the print data in a data-by-data basis or in a page-by-page basis, and information for specifying whether the quality requirement is defined in the data-by-data basis or defined in the page-by-page basis; and transmitting the print data and the quality requirement data to a printing service for a print request.

According to another embodiment of the present invention, an information processing apparatus comprises at least one processor and at least one memory storing a program which is configured to cause the at least one processor to perform: acquiring quality requirement data including information indicating a quality requirement for a print product based on print data of a plurality of pages in a data-by-data basis or in a page-by-page basis, and information for specifying whether the quality requirement is defined in the data-by-data basis or defined in the page-by-page basis, which is common to a plurality of quality requirements; determining one of print data or a page, to which the plurality of quality requirements are applied, by processing according to the information for specifying whether the quality requirement is defined in the data-by-data basis or defined in the page-by-page basis; and instructing, in accordance with a result of the determining one of the print data or the page, an inspection apparatus to perform inspection according to the quality requirement for the print product based on the print data.

According to still another embodiment of the present invention, a printing system comprises an information processing apparatus of a customer, an information processing apparatus of a printing service, a printing apparatus, and an inspection apparatus, wherein the information processing apparatus of the customer comprises at least one processor and at least one memory storing a program which is configured to cause the at least one processor to perform: acquiring print data of a plurality of pages; generating quality requirement data including information indicating a quality requirement for a print product based on the print data in a data-by-data basis or in a page-by-page basis, and information for specifying whether the quality requirement is defined in the data-by-data basis or defined in the page-by-page basis; and transmitting the print data and the quality requirement data to the information processing apparatus of the printing service, and the information processing apparatus of the printing service comprises at least one processor and at least one memory storing a program which is configured to cause the at least one processor to perform: acquiring the print data and the quality requirement data; determining one of print data or a page, to which the quality requirement is applied, by processing according to the information for specifying whether the quality requirement is defined in the data-by-data basis or defined in the page-by-page basis; and instructing the printing apparatus to perform printing based on the print data and instructing, in accordance with a result of the determining one of the print data or the page, the inspection apparatus to perform inspection according to the quality requirement for the print product based on the print data.

According to yet another embodiment of the present invention, an information processing method comprises: acquiring print data of a plurality of pages; generating quality requirement data including information indicating a quality requirement for a print product based on the print data in a data-by-data basis or in a page-by-page basis, and information for specifying whether the quality requirement is defined in the data-by-data basis or defined in the page-by-page basis; and transmitting the print data and the quality requirement data to a printing service for a print request.

According to a still yet another embodiment of the present invention, an information processing method comprises: acquiring quality requirement data including information indicating a quality requirement for a print product based on print data of a plurality of pages in a data-by-data basis or in a page-by-page basis, and information for specifying whether the quality requirement is defined in the data-by-data basis or defined in the page-by-page basis, which is common to a plurality of quality requirements; determining one of print data or a page, to which the plurality of quality requirements are applied, by processing according to the information for specifying whether the quality requirement is defined in the data-by-data basis or defined in the page-by-page basis; and instructing, in accordance with a result of the determining one of the prim data or the page, an inspection apparatus to perform inspection according to the quality requirement for the print product based on the print data.

According to yet still another embodiment of the present invention, a printing method comprises: acquiring print data of a plurality of pages at an information processing apparatus of a customer; generating quality requirement data including information indicating a quality requirement for a print product based on the print data in a data-by-data basis or in a page-by-page basis, and information for specifying whether the quality requirement is defined in the data-by-data basis or defined in the page-by-page basis; transmitting the print data and the quality requirement data to an information processing apparatus of a printing service; acquiring the transmitted print data and the quality requirement data at the information processing apparatus of the printing service; determining one of print data or a page, to which the quality requirement is applied, by processing according to the information for specifying whether the quality requirement is defined in the data-by-data basis or defined in the page-by-page basis; and instructing a printing apparatus to perform printing based on the print data and instructing, in accordance with a result of the determining one of the print data or the page, an inspection apparatus to perform inspection according to the quality requirement for the print product based on the print data.

According to still yet another embodiment of the present invention, a non-transitory computer-readable medium stores a program which causes a computer to perform: acquiring print data of a plurality of pages; generating quality requirement data including information indicating a quality requirement for a print product based on the print data in a data-by-data basis or in a page-by-page basis, and information for specifying whether the quality requirement is defined in the data-by-data basis or defined in the page-by-page basis; and transmitting the print data and the quality requirement data to a printing service for a print request.

According to yet still another embodiment of the present invention, a non-transitory computer-readable medium stores a program which causes a computer to perform: acquiring quality requirement data including information indicating a quality requirement for a print product based on print data of a plurality of pages in a data-by-data basis or in a page-by-page basis, and information for specifying whether the quality requirement is defined in the data-by-data basis or defined in the page-by-page basis, which is common to a plurality of quality requirements; determining one of print data or a page, to which the plurality of quality requirements are applied, by processing according to the information for specifying whether the quality requirement is defined in the data-by-data basis or defined in the page-by-page basis; and instructing, in accordance with a result of the determining one of the print data or the page, an inspection apparatus to perform inspection according to the quality requirement for the print product based on the print data.

Further features of the present invention will become apparent from the following description of exemplary embodiments (with reference to the attached drawings).

BRIEF DESCRIPTION OF THE DRAWINGS

FIG. 2 is a block diagram showing an example of the hardware configuration of an image forming apparatus;

FIG. 4 is a view showing an example of the software configuration of the image forming apparatus;

FIG. 5 is a view showing an example of the software configuration of the information processing apparatus of a printing service;

FIG. 6 is a view showing an example of the software configuration of the information processing apparatus of a customer;

FIG. 8 is a block diagram showing an example of the functional configuration of the printing system;

FIG. 11 is a view showing an example of a user interface configured to submit data;

FIGS. 12A and 12B are views showing examples of data in the PRX format;

FIG. 15 is a view showing an example of a user interface configured to create quality requirement data.

DESCRIPTION OF THE EMBODIMENTS

Figure 1:
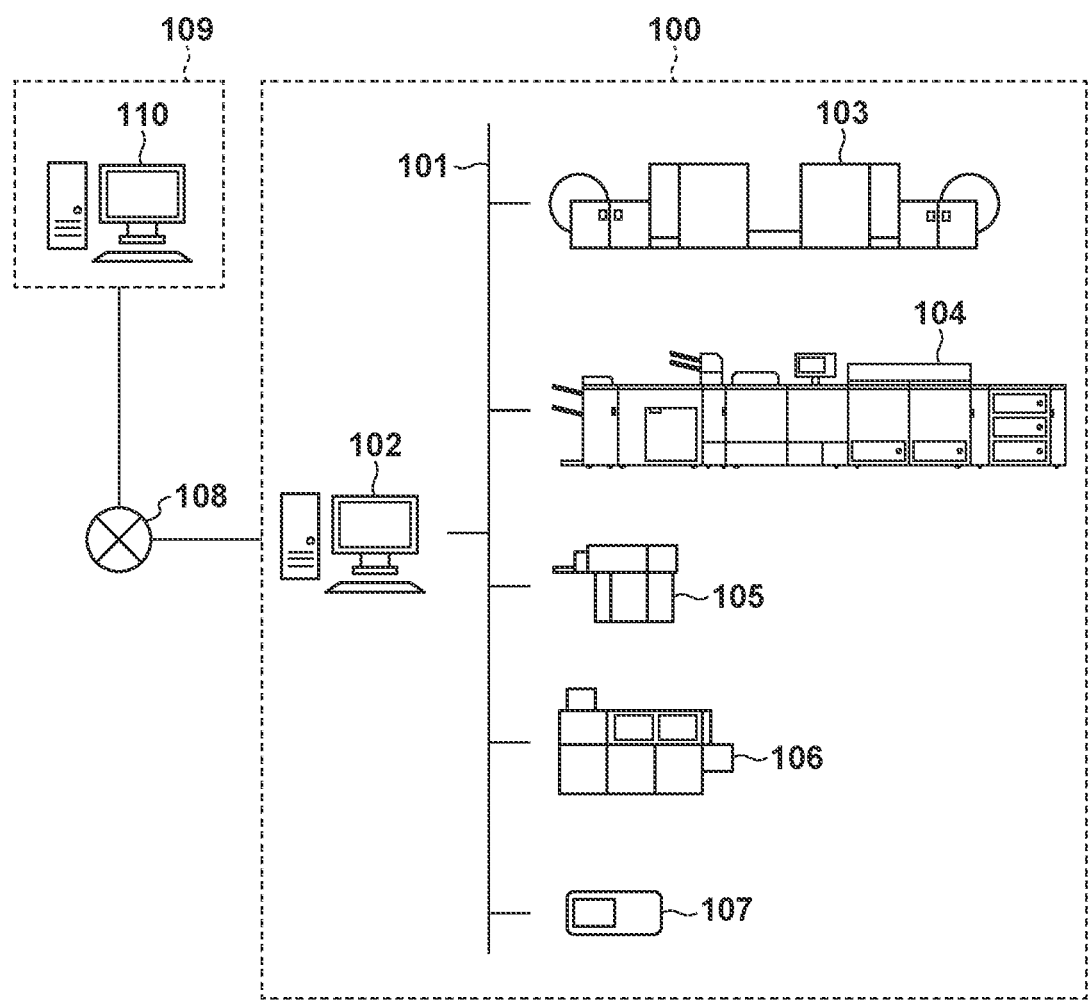
FIG. 1 is a block diagram showing an example of the configuration of a printing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

One print product sometimes includes a plurality of constituent components such as a front cover and a main text, as in a case in which bookbinding is performed. Hence, in quality requirement data in the PRX format or the like, which is used to transmit a quality requirement, the quality requirement is sometimes defined for each constituent component. For example, in a single data file in the PRX format, a quality requirement can be defined for each constituent component. For example, one print data (for example, one PDF file) can include a plurality of constituent components. In this case, a data file in the PRX format can store a quality requirement for each of the plurality of constituent components included in one print data as CustomerItem. On the other hand, print data corresponding to each constituent component may be prepared such that one print product is obtained based on a plurality of print data. In this case, a data file in the PRX format can store a quality requirement for each of the plurality of print data as CustomerItem.

In this case, however, a quality requirement data analysis system held by a printing service cannot discriminate whether each quality requirement is a quality requirement for specific print data or a quality requirement for a specific page in print data. For example, even if the ID of a quality requirement application destination is defined in a quality requirement data in the PRX format, the analysis system needs to confirm, for each of both all print data and all pages, whether that has the same ID and, therefore, the processing efficiency is low.

According to an embodiment of the present invention, it is possible to improve the efficiency of processing of determining a quality requirement application destination in a printing system that conducts a quality requirement using quality requirement data.

FIG. 1 is a block diagram showing a printing system according to an embodiment of the present invention. The printing system shown in FIG. 1 includes a printing service system 100 and a customer system 109, and these are connected by the Internet 108.

The printing service system 100 includes a plurality of apparatuses connected to each other by the network 101, as shown in FIG. 1. The printing service system 100 shown in FIG. 1 includes an information processing apparatus 102, an image forming apparatus 103, an image forming apparatus 104, a laminator 105, a perfect binder 106, and a colorimetric device 107. The image forming apparatus 103 can perform printing on a continuous sheet, and the image forming apparatus 104 can perform printing on a cut sheet. By using these apparatuses, the printing service can produce a print product (product) in an appropriate appearance according to the request of a customer.

In addition, the customer system 109 includes one or more information processing apparatuses 110. In the printing system shown in FIG. 1, the information processing apparatus 110 of the customer system 109 transmits submission data to the printing service system 100, thereby performing manuscript submission to the printing service. The submission data transmitted from the customer system 109 to the printing service system 100 includes print data, a job ticket, and quality requirement data. The print data is, for example, image data. One print data may be one file representing an image, and may be, for example, a file in the PDF format. The job ticket is information that designates the form of a print product to be produced by the printing service system 100, job execution conditions at the time of production, and job settings, and may be, for example, data in the JDF format. The job ticket can include, for example, print setting data representing print settings of print data. The quality requirement data is data representing a requirement of quality required for a print product to be produced by the printing service, and may be, for example, data in the PRX format.

The information processing apparatus 102 in the printing service system 100 receives submission data from the customer system 109. Workflow software that operates on the information processing apparatus 102 controls each apparatus in the customer system 109, thereby producing a print product according to the submission data. Also, the information processing apparatus 102 in the printing service system 100 can receive a notification of a processing result from each apparatus of the customer system 109, convert the received notification into quality report data, and transmit it to the customer system 109. The quality report data is a quality report used to confirm whether the quality requirement from the customer to the printing service is achieved or not and may be, for example, data in the PQX format.

Note that each apparatus in the printing apparatus shown in FIG. 1, including the information processing apparatus 102 and the information processing apparatus 110, may be formed by a plurality of apparatuses connected via, for example, a network.

In this printing system, the printing service can perform production in an appropriate form by selecting an image forming apparatus to be used for the production from the image forming apparatus 103 and the image forming apparatus 104 in accordance with information that designates a delivery form or the like. Also, based on the delivery form, the printing service may select the form of inspection information included in quality report data and, more specifically, information concerning a part where inspection has been executed.

The following advantages can be obtained by employing digitized processing in which the customer transmits, by quality requirement data, a requirement of the quality of a print product required for the printing service, and the printing service reports the quality of a produced print product to the customer by quality report data.

First, when the customer quantitatively presents requirement matters concerning the quality of a print product requested for the printing service, the possibility that a false recognition concerning the quality of the print product occurs between the customer and the printing service can be reduced. Second, since the quality of the print product produced by the printing service is electronically visualized, the customer can immediately grasp the quality of the print product requested to be produced. Third, when a requirement and a report concerning quality are digitized, the customer and the printing service can easily carry out activities for uniforming quality in a case in which a time-series quality fluctuation may occur in long-term production of the print product. Fourth, if the customer requests a plurality of printing services to do production, the customer and the printing service can easily carry out activities for uniforming quality because quality variations between the printing services can be visualized, FIG. 2 shows the hardware configuration of the image forming apparatus 104 according to an embodiment. The image forming apparatus 104 has a reading function of reading an image on a sheet, and a print function of printing an image on a sheet. The image forming apparatus 104 may also have a post-processing function of binding a plurality of sheets with printed images, aligning the plurality of sheets, and discharging the sheets to a tray selected from a plurality of trays. Note that sheets as a print target include paper sheets such as plain paper and cardboard and film sheets. Note that the image forming apparatus 103 can have the same configuration as the image forming apparatus 104 except that printing is performed for a continuous sheet, and a description thereof will be omitted.

The image forming apparatus 104 shown in FIG. 2 includes a plurality of function units having different roles and connected to each other and can perform complex sheet processing. In the image forming apparatus 104, a printer unit 203 can form an image, using toner, on a sheet conveyed from a sheet feeding unit 212 that stores sheets.

An inspection unit 214 can inspect image information formed on a sheet by the printer unit 203. The inspection unit 214 can inspect the amounts of print position deviations (misregistration amounts) between CMYK or the difference (color difference) between the color of an image formed by compositing CMYK and a color defined by print data. The inspection unit 214 may inspect the reading accuracy of a barcode portion included in a formed image, or an image defect such as a scratch or flaw on an image. The inspection unit 214 can optically read the image of a sheet on which the image is formed, and generate inspection result data based on the obtained image. The obtained inspection result data is transmitted to the information processing apparatus 102 via an external I/F 202.

The image forming apparatus 104 according to this embodiment is configured such that various kinds of associated apparatuses can be attached. As an example of the associated apparatus, a sheet processing apparatus 210 is shown in FIG. 2. The sheet processing apparatus 210 can perform various kinds of processing for a sheet on which an image is formed by the printer unit 203. The sheet processed by the sheet processing apparatus 210 is discharged to a tray unit 213 and stacked.

A controller unit (for example, a CPU) 205 can generally control processes, operations, and the like performed by units provided in the image forming apparatus 104. The controller unit 205 can perform such processing by reading out a program stored in a ROM 207 or a RAM 208 and executing it. The RAM 208 is a volatile memory and can temporarily store programs and data.

The image forming apparatus 104 is provided with an operation unit 204. The operation unit 204 can provide various kinds of interfaces to be used by an operator when doing settings and operations of the image forming apparatus 104. The controller unit 205 can cause the operation unit 204 to display a user interface screen in accordance with a display control program stored in the ROM 207.

An HDD (hard disk) 209 is a nonvolatile memory and can store a print job acquired from the information processing apparatus 102 via the external I/F 202. The print job can include print data and print setting information. The controller unit 205 can interpret and process the print job received from the information processing apparatus 102. For example, the controller unit 205 interprets code data included in print data (a page description language or image data) such as a PDF file, thereby expanding the print data into image data. The HDD 209 can also store thus obtained image data. The printer unit 203 can form an image on a sheet based on the image data obtained from the print data.

The HDD 209 may store compressed image data. A compression/decompression unit 206 can perform compression processing and decompression processing for image data. As the compression method, JBIG or JPEG can be used.

A medium management unit 211 can manage information concerning a medium type.

An example of the configuration of programs stored in the ROM 207 and executed by the controller unit 205 will be described below with reference to FIG. 4.

A boot loader 401 is a program to be executed immediately after the image forming apparatus 104 is powered on. This program includes a program configured to execute various kinds of activation sequences necessary for activating the system.

An operating system 402 provides an execution environment for various kinds of programs configured to implement the functions of the image forming apparatus 104. The operating system 402 provides the functions of resource management of the memories (the ROM 207, the RAM 208, the HDD 209, and the like) of the image forming apparatus 104, and input/output control of the units shown in FIG. 2.

A network control program 403 is executed when transmitting/receiving data to/from a device connected via the network. This program is used for print job reception processing, transmission of inspection result data generated by the inspection unit 214, and transmission/reception of other data and commands to/from an external device. The network control program 403 also includes a driver program configured to control the external I/F 202.

A reception program 404 is a program configured to accept various kinds of instructions and information from the information processing apparatus 102. Information to be received by the reception program 404 includes a designation of an inspection target for the inspection unit 214.

A transmission program 405 is a program configured to transmit information to the information processing apparatus 102. Information to be transmitted using the transmission program 405 includes inspection result data generated by inspection of the inspection unit 214.

A JDF function program 406 is a program that executes a JDF print function if a job ticket in the JDF format is received by the image forming apparatus 104 via the external I/F 202. Using the JDF function program 406, it is also possible to perform analysis processing of a job ticket, processing of discriminating whether an incorrect setting is included in the job ticket, and setting change processing of canceling the incorrect setting. A PDF function program 407 is a program that performs print data expansion processing and print processing if print data in the PDF format is received by the image forming apparatus 104. The PDF function program 407 is configured to operate together with the JDF function program 406 to make various kinds of designations in print processing. When the controller unit 205 issues operation instructions to the units shown in FIG. 2, such as the sheet processing apparatus 210, the printer unit 203, the HDD 209, the compression decompression unit 206, and the RAM 208, print processing is performed.

A medium management program 408 is a program configured to execute a management function associated with sheets usable by the image forming apparatus 104. Sheet-associated information managed by this program is stored in the HDD 209.

A sheet count program 409 is a program configured to, when the printer unit 203 has performed image formation on a sheet stored in the sheet feeding unit 212, count and manage the number of sheets used for printing in association with the size information of the sheets.

An inspection program 410 is a program configured to control the inspection unit 214 and cause it to generate inspection result data by image inspection for a print product obtained by print processing. The thus generated inspection result data is transmitted by the transmission program 405 to the information processing apparatus 102.

Figure 3:
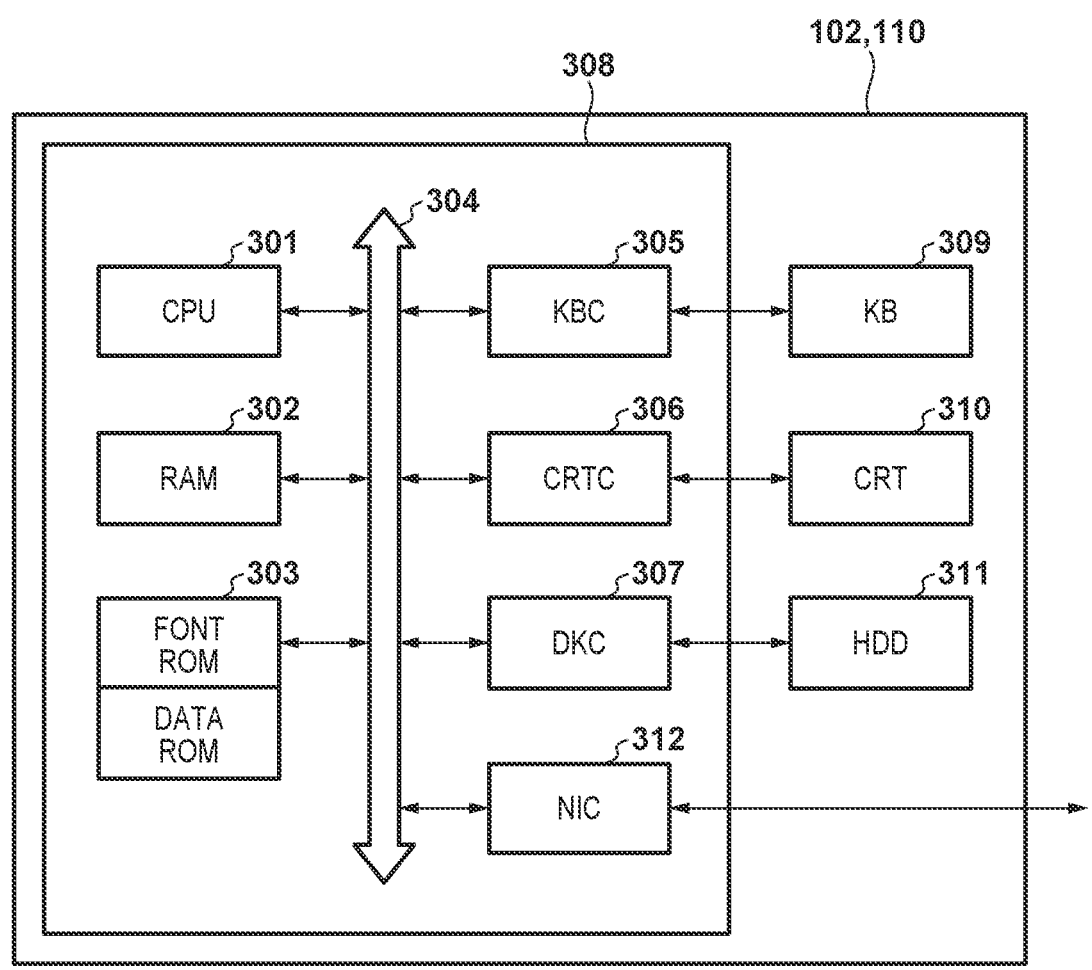
FIG. 3 is a block diagram showing an example of the hardware configuration of an information processing apparatus.

FIG. 3 is a block diagram showing an example of the configuration of the information processing apparatuses 102 and 110. Each of the information processing apparatuses 102 and 110 may be a general computer. Referring to FIG. 3, a CPU 301 executes an operating system or an application program stored in a ROM 303 or loaded from an HDD 311 into a RAM 302, thereby performing various processes. The ROM 303 can further store fonts and data. The RAM 302 can function as a main memory or work area for the CPU 301.

A keyboard controller (KBC) 305 acquires an input from a keyboard (KB) 309 or a pointing device (not shown). A display controller (CRTC) 306 controls display on a display unit (CRT) 310. A disk controller (DKC) 307 controls access to the HDD 311. The HDD 311 can store boot programs, application programs, font data, and the like. A network controller (NIC) 312 is connected to a network and performs communication control processing with another device on the network. The network controller (NIC) 312 may be a controller for a wired LAN, a controller for a wireless LAN, or a controller connectable to both. A bus 304 connects the CPU 301, the RAM 302, the ROM 303, and various kinds of controllers to each other and transports data signals and control signals.

Note that each of the information processing apparatuses 102 and 110 may be a portable terminal and, in this case, may include a touch panel controller or the like in place of the keyboard controller (KBC) 305. Also, each of the information processing apparatuses 102 and 110 may include a mass storage device in place of the HDD 311.

FIG. 5 shows an example of the configuration of programs stored in the information processing apparatus 102 in the printing service system 100. The CPU 301 of the information processing apparatus 102 can perform processing in accordance with the programs.

A boot loader 501 and an operating system 502 are the same as the boot loader 401 and the operating system 402 shown in FIG. 4, and a description thereof will be omitted. A network control program 503 is executed when transmitting/receiving data to/from a device connected via the network. This program is used when instructing the image forming apparatus 103 or 104 to perform print processing based on submission data received from the customer system 109. For example, the network control program 503 can transmit print data and a job ticket to the image forming apparatus 103 or 104. Also, the network control program 503 can be used to instruct the laminator 105 to perform decoration processing for a print product obtained by printing or instruct the perfect binder 106 to perform post-processing for the print product. Furthermore, the network control program 503 can be used to instruct the image forming apparatus 103 or 104 to perform inspection using the inspection unit 214 or receive quality report data obtained by the inspection unit 214.

A web server 504 is a server program configured to cause an external device connected via the network to use a web service. The web server 504 can receive a requirement from the external device and return a result of executing processing according to the contents of the requirement to the external device as page information. In this embodiment, the web server 504 can receive submission data from the customer system 109 for manuscript submission from the customer to the printing service. Also, the web server 504 can be used to provide quality report data (for example, data in the PQX format) to the customer system 109. The web server 504 may provide various other services.

A workflow control program 505 is a program that implements a workflow function, and can concentratedly manage processing, control, job execution, and the like in the apparatuses connected via the network 101 of the printing service system 100. The workflow control program 505 can control an execution order and job execution when manufacturing a print product in a plurality of steps using a plurality of apparatuses. Also, the workflow control program 505 can control selection and switching of an apparatus to be used, recovery production, and the like. The workflow control program 505 can also issue various kinds of instructions to the operator who operates the printing service system 100. The workflow control program 505 according to this embodiment can also receive and accumulate inspection result data from an apparatus in the printing service system 100 and generate quality report data in the PQX format at a predetermined timing. For example, the workflow control program 505 can receive inspection result data concerning the quality of a printed image from the inspection unit 214 of the image forming apparatus 103 or 104 and generate quality report data based on the data.

A submission system program 506 can hold and manage, in the printing service system 100, a request from the customer system 109. The submission system program 506 is used to electronically execute various kinds of functions necessary for order reception/ordering-associated tasks, for example, processing such as data transmission between the customer system 109 and the printing service system 100 and issuance of a bill in cooperation with the web server 504. The communication specifications between the customer system 109 and the printing service system 100 are not particularly limited and, for example, PrintTalk specifications can be used.

A reception program 507 can receive and analyze quality requirement data (for example, data in the PRX format) in submission data transmitted from the customer system 109. The reception program 507 can then transmit instructions and settings for creating a print product of quality required by the customer to an apparatus in the printing service system 100 via the workflow control program 505 or present these to the operator.

In this embodiment, the reception program 507 receives quality requirement data sent from the customer system 109 to the printing service system 100 via the web server 504. However, the configuration is not limited to this. For example, the reception program 507 may receive quality requirement data directly from the customer system 109. In addition, the reception program 507 may operate as a web content on the web server 504.

A transmission program 508 can transmit quality report data (for example, data in the PQX format) generated by the workflow control program 505 to the customer system 109. In this embodiment, the customer system 109 transmits a request of quality report data via the web server 504, and the transmission program 508 transmits quality report data to the customer system 109 as a response to the request. However, the transmission program 508 may directly transmit the quality report data to the customer system 109, or the transmission program 508 may operate as a web content on the web server 504.

FIG. 6 shows an example of the configuration of programs stored in the information processing apparatus 110 of the customer system 109. The CPU 301 of the information processing apparatus 110 can perform processing in accordance with the programs. A boot loader 601 and an operating system 602 are the same as the boot loader 501 and the operating system 502 shown in FIG. 5, and a description thereof will be omitted. A network control program 603 is executed when transmitting/receiving data to/from a device connected via the network. This program is used to transmit/receive data to/from the priming service system 100 via the Internet 108. Also, this program is used in rendering display processing using a web browser to be described later.

A web browser 604 is a client program configured to use a web service provided by an external system connected via the network. In this embodiment, the web browser 604 can transmit submission data to the customer system 109 for manuscript submission to the printing service. Also, the web browser 604 can be used to acquire quality report data (for example, data in the PQX format) from the customer system 109. As described above, data submission, quality requirement, and quality report functions between the customer system 109 and the printing service system 100 can be provided to the user via the web browser 604. The web browser 604 may be able to use various other services.

A PDF creation program 605 is a program configured to create print data to be printed by the printing service system 100 and, in this embodiment, can create image data in the PDF format. Note that the format of print data may be a format other than the PDF format. Also, the PDF creation program 605 may perform processing of adding an image to input image data in the PDF format.

A PRX creation program 606 is a program configured to create quality requirement data to be transmitted to the printing service system 100 and, in this embodiment, can create quality requirement data in the PRX format. Detailed contents of the requirement shown in the quality requirement data, the requirement setting method, and the data format of the quality requirement data will be described later.

A JDF creation program 607 is a program configured to create a job ticket to be transmitted to the printing service system 100 and, in this embodiment, can create quality requirement data in the JDF format. Detailed contents of settings designated by the job ticket, the setting method, and the data format of the job ticket will be described later.

A transmission program 608 is used to transmit quality requirement data created by the PRX creation program 606 to the punting service system 100. A reception program 609 is used to receive quality report data created by the printing service system 100.

FIG. 8 is a system configuration diagram showing processing of functional modules included in the customer system 109 and the printing service system 100, which form the printing system, and the association between the modules. FIG. 8 shows, as subsystems included in the information processing apparatus 110 of the customer system 109, a UI unit 816, a data creation application unit 703, and a web browser unit 704. The UI unit 816 is a function unit that accepts a user instruction such as display of image information, a data input/output instruction, or an operation instruction and corresponds to the KBC 305 and the CRTC 306. The UI unit 816 can issue instructions to the data creation application unit 703 and the web browser unit 704. The data creation application unit 703 corresponds to the PDF creation program 605, the PRX creation program 606, and the JDF creation program 607, and is implemented by the CPU 301 executing these programs. The web browser unit 704 corresponds to the web browser 604, and is implemented by the CPU 301 executing this program.

In addition, FIG. 8 shows, as subsystems included in the information processing apparatus 102 of the printing service system 100, a web server unit 705, a submission system unit 706, and a workflow control unit 707. The web server unit 705 corresponds to the web server 504, and can be implemented by the CPU 301 executing this. A page generation unit 801 can generate page information in accordance with a request from the web browser unit 704 and provide it to the web browser unit 704. The page generation unit 801 can also issue a print processing execution instruction to a control unit 807 in the submission system unit 706. A PDF transfer unit 802, a print setting transfer unit 803, and a PRX transfer unit 804 respectively transfer print data, a job ticket, and quality requirement data transmitted from the web browser unit 704 to the submission system unit 706. The print data (PDF format), the job ticket (JDF format), and the quality requirement data (PRX format) are submission data transmitted from the web browser unit 704. Here, the PRX transfer unit 804 further receives quality requirement application range setting information designated by a user 701 from a PRX application range designation unit 815, and transfers it to the submission system unit 706 together with the quality requirement data. Also, a PRX reception unit 805 receives quality report data 811 (PRX format) created by a quality report creation unit 820 and transmitted to the submission system unit 706.

The submission system unit 706 corresponds to the submission system program 506 and is implemented by the CPU 301 executing this program. The control unit 807 transmits submission data (print data 808, a job ticket 809, and quality requirement data 810) to a job registration request unit 806 of the workflow control unit 707. Also, the control unit 807 can add information designated by the user to the quality requirement data transferred from the PRX transfer unit 804.

The workflow control unit 707 corresponds to the workflow control program 505 and is implemented by the CPU 301 executing this program. The job registration request unit 806 manages a job to be performed by each apparatus included in the printing service system 100. The job registration request unit 806 can instruct the image forming apparatus 104 to execute a print job based on submission data acquired from the submission system unit 706. For example, the job registration request unit 806 can transmit the print data 808 to a PDF interpreter 819. In addition, the job registration request unit 806 can instruct a print setting unit 814 to do print settings according to the job ticket 809. Furthermore, the job registration request unit 806 can issue an instruction concerning the delivery form and an instruction to inspect a print product to the print setting unit 814 in accordance with an analysis result of the quality requirement data 810 by the workflow control unit 707 (steps S726 and S728 to be described later). In addition, the quality report creation unit 820 receives inspection result data concerning the quality of a produced print product from each apparatus included in the printing service system 100, and generates quality report data (PQX format) as a quality report.

The image forming apparatus 104 includes a print control unit 708, a sheet management unit 818, the printer unit 203, and the inspection unit 214. The print control unit 708 corresponds to the controller unit 205, and includes a job execution unit 812 and the PDF interpreter 819. The job execution unit 812 includes an image generation unit 813 and the print setting unit 814. In accordance with an instruction from the job registration request unit 806, the print setting unit 814 instructs the image generation unit 813 to execute image generation processing and instructs the PDF interpreter 819 to execute analysis processing of the print data 808. Also, in accordance with an instruction from the job registration request unit 806, the print setting unit 814 instructs the inspection unit 214 to execute, for a produced print product, inspection concerning quality requirement items designated by the quality requirement data 810. The PDF interpreter 819 transmits intermediate data (not shown) obtained by the analysis for the print data 808 to the image generation unit 813. The image generation unit 813 generates image data from the intermediate data and transmits it to the printer unit 203 under the control of the print setting unit 814.

The sheet management unit 818 corresponds to the sheet count program 409, and can count sheets used for printing in association with the size and type of the sheets. The printer unit 203 performs image formation on a sheet in accordance with the image data generated by the image generation unit 813. The inspection unit 214 performs inspection of the image on the sheet formed by the printer unit 203 and transmits inspection result data to the quality report creation unit 820.

Figure 7A:
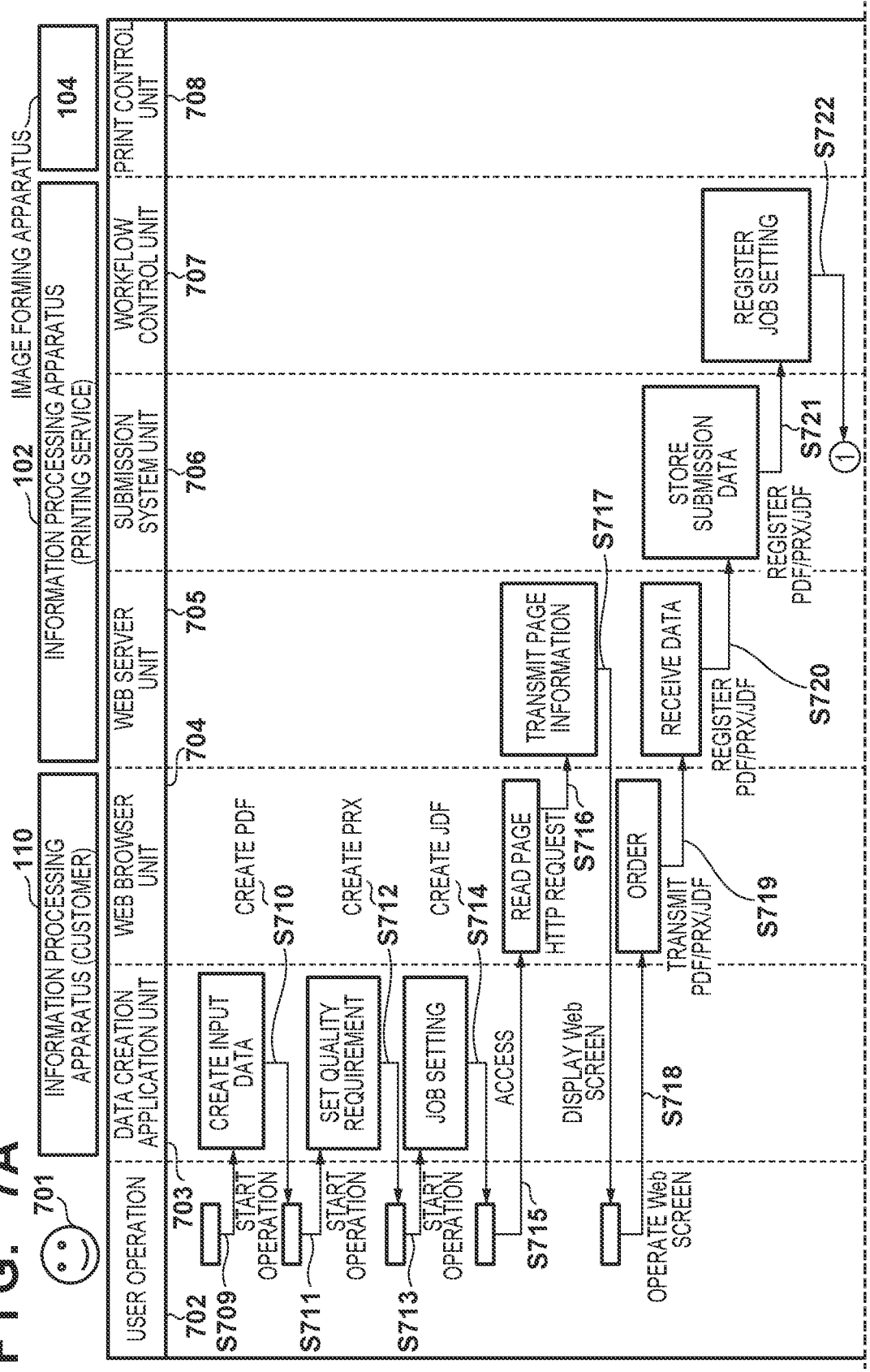
FIGS. 7A and 7B are flowcharts for explaining an example of the processing procedure of the printing system.
Figure 7B:
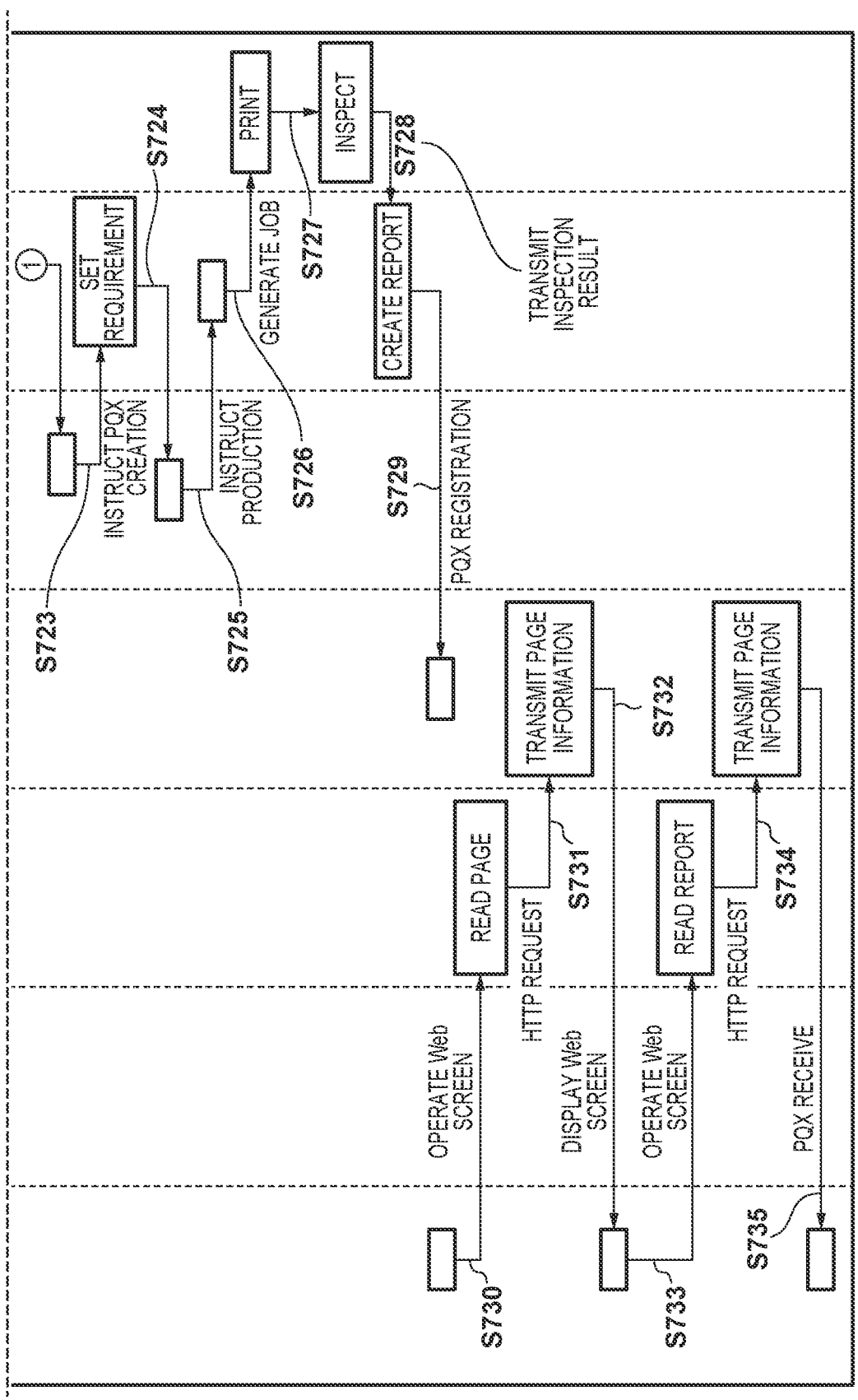

FIGS. 7A and 7B show the procedure when the customer system 109 and the printing service system 100, and the customer (user 701) who is the operator of the information processing apparatus 110 of the customer system 109 use the printing system shown in FIG. 1. FIGS. 7A and 7B show the procedure of control performed between the information processing apparatuses 102 and 110 and the image forming apparatus 104 when the user 701 performs a user operation 702. The user operation 702 corresponds to an operation for the data creation application unit 703 via a display screen, and a procedure generated in accordance with the operation is shown in FIGS. 7A and 7B.

In step S709, the user 701 instructs to create print data to be transmitted to the printing service system 100 for manuscript submission. In step S710, the PDF creation program 605 performs processing for creating print data in the PDF format based on the operation of the user 701.

In step S711, the user 701 instructs to create quality requirement data to be transmitted to the printing service system 100. In step S712, the PRX creation program 606 performs processing for creating quality requirement data in the PRX format based on the operation of the user 701. In this embodiment, the PRX creation program 606 creates quality requirement data such that it includes information representing the application range of the quality requirement. This processing will be described later with reference to FIG. 13.

In step S713, the user 701 instructs to create a job ticket to be transmitted to the printing service system 100. In step S714, the JDF creation program 607 performs processing for creating a job ticket in the JDF format based on the operation of the user 701.

Creation of submission data to be transmitted to the printing service is thus completed, and the processing advances to data submission processing for the printing service. In step S715, the user 701 performs an operation of causing the web browser unit 704 to display an operation screen used to submit data to the printing service. For example, the user 701 can input a URL to access the web server unit 705 of the printing service system 100. In step S716, based on the input URL information, the web browser unit 704 transmits an http request to the web server unit 705 operating on the information processing apparatus 102 of the printing service system 100. In step S717, in response to the request, the web server unit 705 returns page information necessary for rendering processing as a response. The web browser unit 704 can thus display a submission screen.

In step S718, the user 701 performs an operation on the submission screen displayed by the web browser unit 704, thereby instructing execution of ordering processing. In step S719, the web browser unit 704 transmits the print data and the quality requirement data to request the printing service to do printing. In this example, the web browser unit 704 transmits the submission data, that is, the print data, the job ticket, and the quality requirement data to the web server unit 705, thereby submitting the data to the printing service system 100. Here, the web browser unit 704 can transmit a plurality of print data. (for example, PDF files) to the web server unit 705, as will be described later with reference to FIG. 11. Also, the print data can include image information of a plurality of pages. Furthermore, as shown in FIG. 11, the web browser unit 704 can transmit two or more print data and one quality requirement data (for example, one file in the PRX format) indicating a quality requirement for the two or more print data.

In step S720, the web server unit 705 receives the above-described data including the print data and the quality requirement data, and stores each received data in the submission system unit 706. From step S721, a print product is produced in the printing service system 100 based on the submitted data. In step S721, the submission system unit 706 registers the transmitted submission data in the workflow control unit 707. In step S722, the workflow control unit 707 generates and registers a print job based on the submission data. Also, in this embodiment, in step S723, the submission system unit 706 instructs the workflow control unit 707 to create quality report data such that quality report data corresponding to the designated quality requirement data is generated. In step S724, the workflow control unit 707 registers the creation request of quality report data.

Up to step S724, preparation for starting production of a print product is completed. In step S725, the submission system unit 706 instructs the workflow control unit 707 to start production, that is, execute a job. In step S726, the workflow control unit 707 generates a print job and transmits it to the print control unit 708 corresponding to the image forming apparatus 104. In this embodiment, the workflow control unit 707 analyzes the quality requirement data included in the submission data registered in step S721. The workflow control unit 707 then instructs the print control unit 708 to inspect the print product such that a quality requirement is satisfied in a designated range of the print product. In this embodiment, the workflow control unit 707 determines print data or a page to be applied to each of a plurality of quality requirements by processing according to information for specifying whether the quality requirement is defined in a data-by-data basis or in a page-by-page basis. In accordance with the determination result, the workflow control unit 707 instructs the image forming apparatus 104 to perform inspection according to a quality requirement for a print product based on the print data. In this embodiment, the image forming apparatus 104 functions as a printing apparatus (printer unit 203) configured to perform printing based on print data, and also functions as an inspection apparatus (inspection unit 214) configured to inspect a print product. A detailed processing method will be described later with reference to FIG. 14.

In step S726, the workflow control unit 707 can discriminate the delivery form based on the quality requirement data. For example, the workflow control unit 707 can discriminate whether the delivery form is roll finishing or cut finishing. If the delivery form is roll finishing, an inspection portion can be specified by the length from the top of roll paper when designating the inspection portion or when reporting the inspection result. If the delivery form is cut finishing, an inspection portion can be specified by the count of produced sheets from the start of production, that is, from the start of the job. As described above, the designation method of the inspection position on a sheet in the inspection result data generated by the inspection unit 214 or in the quality report data generated by the quality report creation unit 820 can be switched based on the instruction concerning the delivery form indicated by the quality requirement data. Note that depending on whether the delivery form is roll finishing or cut finishing, the workflow control unit 707 may select which one of the image forming apparatuses 103 and 104 is to be used for printing.

In step S727, the print control unit 708 starts print processing based on the instruction in step S726. In step S728, the inspection unit 214 of the image forming apparatus 104 performs inspection for the produced print product and sends inspection result data to the workflow control unit 707. In step S729, the workflow control unit 707 converts the obtained inspection result data into quality report data in the PQX format, and stores it in the web server unit 705.

As described above, production of a print product and creation of quality report data are performed by the printing service system 100. In step S730, to confirm the quality of the print product based on the submission data, the user 701 performs, via the web browser unit 704, an operation of displaying an operation screen necessary for acquiring quality report data. For example, when the user 701 inputs a URL to access the web server unit 705 of the printing service system 100, in step S731, the web browser unit 704 transmits an http request to the web server unit 705. In step S732, the web server unit 705 returns a corresponding web screen as a response. In step S733, on the web screen displayed via the web browser unit 704, the user 701 instructs the web browser unit 704 to acquire the quality report data. Then, in step S734, the http request is transmitted to the web server unit 705. In step S735, the quality report data is provided to the user 701 as a response.

Figure 9A:
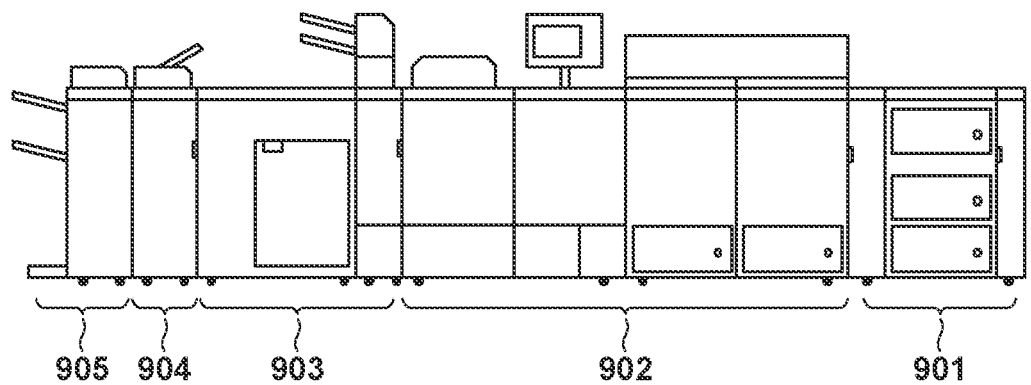
FIGS. 9A and 9B are views for explaining an example of the configuration of an inspection apparatus.

The configuration of the inspection unit included in the image forming apparatus 104 and the inspection method will be described next with reference to FIGS. 9A and 9B. The arrangement and the connection state of the modules of the image forming apparatus 104 and a sheet conveyance path will be described first with reference to FIG. 9A that is a schematic view of the image forming apparatus 104. A sheet feeding unit 901 is connected adjacently to an image forming unit 902 corresponding to the printer unit 203, and an intermediate processing unit 903 is connected adjacently to the opposite side of the sheet feeding unit 901. The intermediate processing unit 903 can be, for example, an inserter configured to insert an insertion sheet to a specific portion of a produced print product or a cooling device configured to remove heat generated by fixing processing in the image forming unit. An inspection unit 904 corresponding to the inspection unit 214 is connected to the subsequent stage of the intermediate processing unit 903. In addition, a post-processing unit 905 is connected to the subsequent stage of the inspection unit 904. The post-processing unit 905 can perform processing for a sheet after printing, such as binding using a stapler or punching using a punching device. Note that the configuration shown in FIG. 9A is merely an example, and the types, number, and connection order of the modules of the image forming apparatus 104 are not limited to the example shown in FIG. 9A.

Figure 9B:
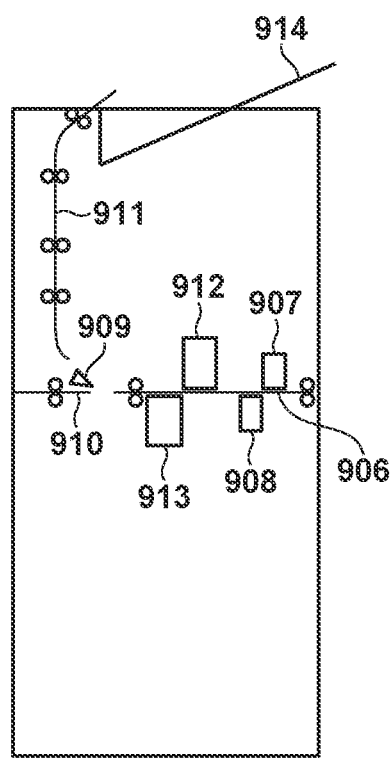

FIG. 9B is a schematic view showing the internal configuration of the inspection unit 904. A printed sheet from the module of the preceding stage of the inspection unit 904 is conveyed through a conveyance path 906. An inspection unit 907 and an inspection unit 908, which are configured to inspect images formed on the sheet, are arranged on the upper and lower sides of the sheet, respectively, to simultaneously inspect images on the obverse surface and the reverse surface of the sheet. In this embodiment, the inspection unit 907 and the inspection unit 908 are contact image sensors arranged to extend in the main scanning direction. According to this configuration, the inspection unit 907 and the inspection unit 908 can continuously read the images on the sheet conveyed through the conveyance path 906 according to the conveyance speed of the sheet, and can accurately acquire the information of the images formed on the sheet. For example, the inspection unit 907 and the inspection unit 908 can perform image inspection such as detection of an image defect such as a position deviation or a stain and inspection of a barcode reading accuracy.

An inspection unit 912 and an inspection unit 913 are arranged along the conveyance path 906 at the subsequent stage of the inspection unit 907 and the inspection unit 908. The inspection unit 912 and the inspection unit 913 are spectral colorimeters and are arranged on the upper and lower sides of the sheet, respectively, to simultaneously inspect the images on the obverse surface and the reverse surface of the sheet, like the inspection unit 907 and the inspection unit 908. When the inspection unit 912 and the inspection unit 913 are used, the color information of an image of a specific portion of the sheet can correctly be inspected.

By controlling the position of a flapper 909, the sheet that has passed through the inspection units 907, 908, 912, and 913 is conveyed to the post-processing unit 905 at the subsequent stage of the inspection unit 904 via a conveyance path 910 or conveyed to a discharge tray 914 via a conveyance path 911. For example, if the sheet to be conveyed is not a part of a product but a sheet for test printing aiming at confirming a color tint or an image state, the position of the flapper 909 is controlled to guide the sheet to the conveyance path 911 to prevent such a sheet from mixing into the product.

Figure 10A:
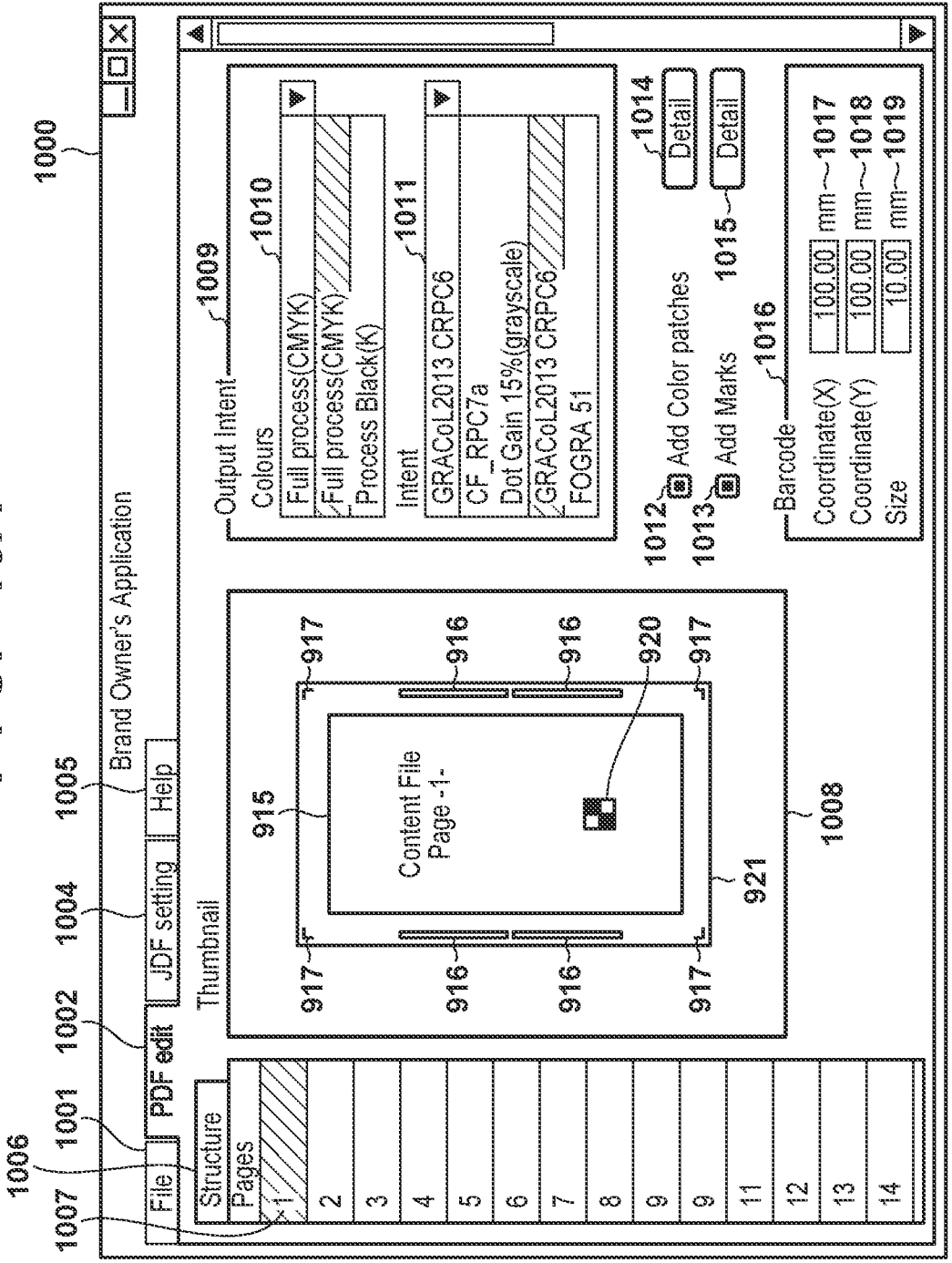
FIGS. 10A and 10B are views showing examples of a user interface configured to create submission data.

An example of a user interface used to create submission data in the information processing apparatus 110 of the customer system 109 will be described next with reference to FIGS. 10A and 10B. FIG. 10A shows an example of an application screen used to create or edit a PDF file that is print data. Note that the application shown in FIG. 10A provides a plurality of functions, and a function is selected by selecting a tab. In the user interface shown in FIG. 10A, it is possible to switch between a general-purpose function setting tab 1001, a PDF editing tab 1002, a JDF setting tab 1004, and a help function tab 1005. FIG. 10A shows a screen displayed when the PDF editing tab 1002 is selected.

A page selection portion 1006 is a region where a page as a setting target is selected if a print product based on print data is formed by a plurality of pages. In FIG. 10A, the first page (1007) is selected. A thumbnail display region 1008 is as reference image display region where the image information of the page selected in the page selection portion 1006 is displayed. The user can do various kinds of settings while visually confirming the selected page.

A register mark setting portion 1013 is used to add register marks 917 to the image. When an instruction to add register marks to the image is input using the register mark setting portion 1013, the register marks 917 are added to the setting target page of the PDF file. Similarly, a color patch selling portion 1012 is used to add color patches 916 to the setting target page of the PDF file. A register mark detail setting portion 1015 and a color patch detail setting portion 1014 are used to set detailed information such as the adding positions of the color patches 916 and the register marks 917. For example, the positions of the color patches 916 and the register marks 917 can be adjusted such that these do not overlap an image region 915 in the print data.

A barcode information designation portion 1016 is used to designate the position of a barcode image included in the image region 915 in the print data. The position of the barcode image is designated using an x-coordinate input portion 1017 and a y-coordinate input portion 1018 to which positions from an origin 921 are input, and a size input portion 1019 to which the size information of the barcode image is input.

The register marks 917, the color patches 916, and a barcode 920 can be set to targets of inspection by the inspection unit 214. That is, each of the register marks 917, the color patches 916, and the barcode 920 is a target of inspection to satisfy quality conditions indicated by quality requirement data and corresponds to additional image information used to generate quality report data.

An output intent setting portion 1009 is used to set output intent information. More specifically, a setting portion 1010 configured to set an image forming process applied in image formation and a setting portion 1011 configured to set a color intent applied to an image to be output are prepared. When the page selection portion 1006 is used, these pieces of output intent information can be set for each page.

Figure 10B:
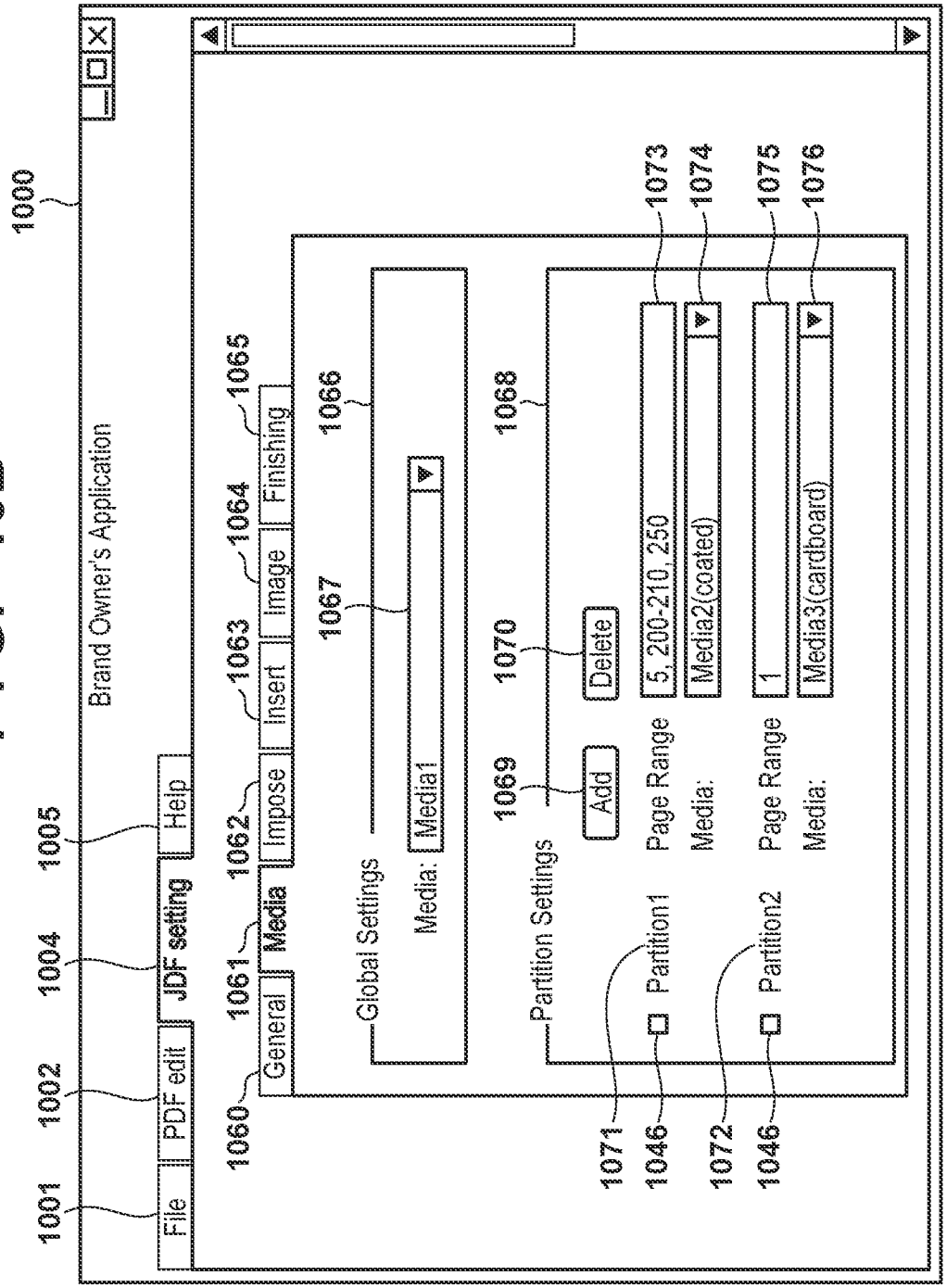

FIG. 10B shows a screen displayed when the JDF setting tab 1004 used to create or edit a job ticket is selected. In this screen, tabs such as a general setting tab 1060, a medium setting tab 1061, an imposition setting tab 1062, an insertion sheet setting tab 1063, an image processing setting tab 1064, and a post-processing setting tab 1065 are provided, and detailed settings can be done. FIG. 10B shows a screen displayed when the medium selling tab 1061 is set.

FIG. 10B shows a job global medium setting portion 1066 and a job partition medium setting portion 1068. The job global medium setting portion 1066 is used to select a medium used in a print job. In FIG. 10B, "Media1" is selected as the medium type of the entire job by a selection portion 1067. In this case, "Media1" is used as a medium at the time of print processing according to the job ticket.

On the other hand, the job partition medium setting portion 1068 is used to do a setting for using, in a specific page or page range, a medium different from the medium set by the job global medium setting portion 1066. FIG. 10B shows a button 1069 configured to add a page range as a setting target and a button 1070 configured to delete a page range as a setting target. A check box 1046 is used to enable medium settings for each page range.

FIG. 10B shows a state in which two page ranges are designated. That is, a medium setting 1071 shows that "Media2 (coated)" selected by a selection portion 1074 is used as a medium for page 5, pages 200 to 210, and page 250 shown in a page range 1073. Also, a medium setting 1072 shows that "Media3 (cardboard)" selected by a selection portion 1076 is used as a medium for page 1 shown in a page range 1075.

Figure 15:
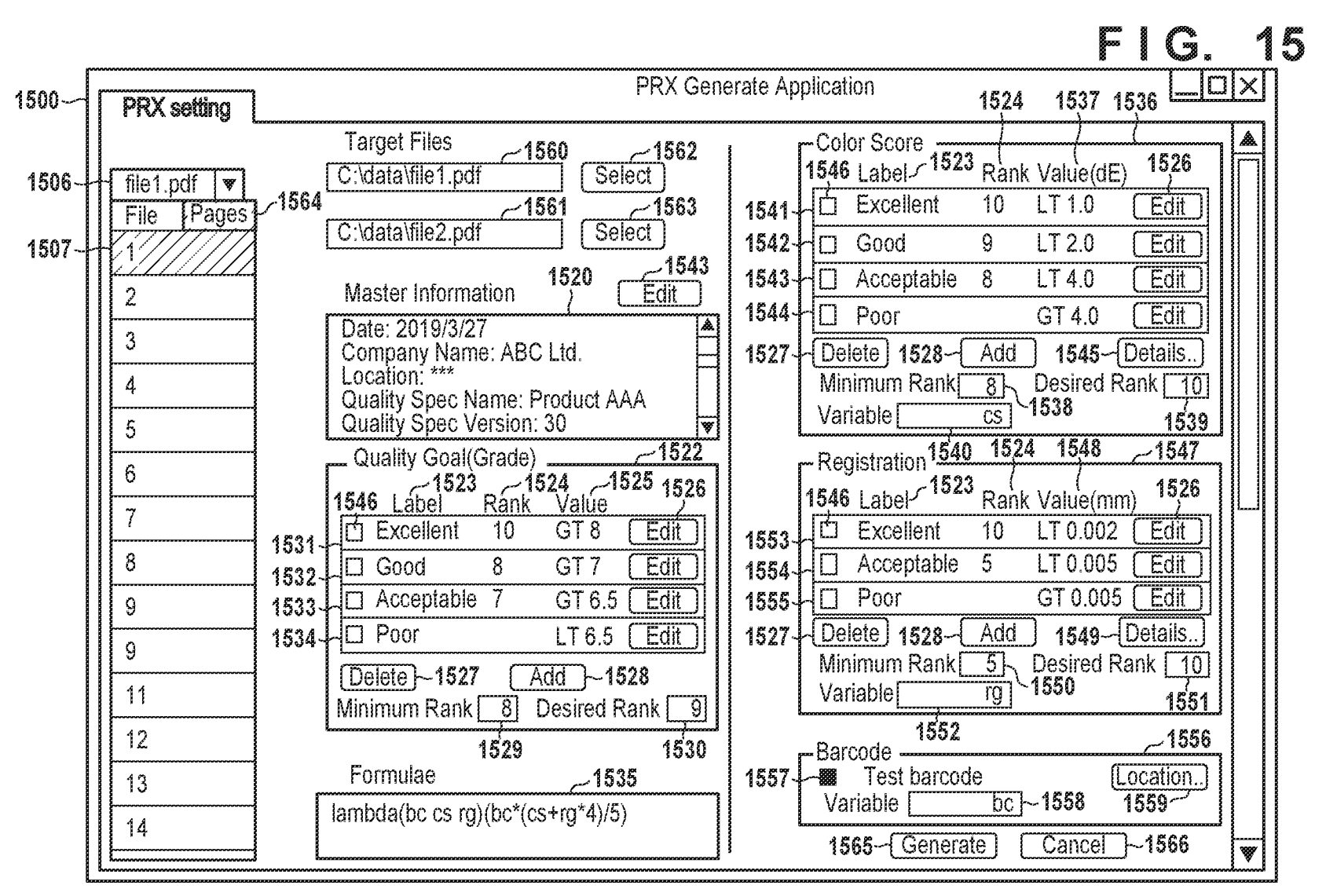

FIG. 15 shows an example of an application screen used to edit quality requirement data in the information processing apparatus 110 of the customer system 109. The user interface shown in FIG. 15 includes an overall quality target setting portion 1522, a color quality setting portion 1536, an image position deviation quality setting portion 1547, a barcode reading quality setting portion 1556, and an equation setting portion 1535, which correspond to setting portions configured to set quality requirements. The user interface shown in FIG. 15 also includes a selection portion 1564 and a page selection portion 1507, which correspond to designation portions configured to designate print data or a page to which the quality requirements are applied. The UI unit 816 can display this user interface on the screen. Also, the data creation application unit 703 can generate quality requirement data based on a user instruction on the user interface.

Selection portions 1560 and 1561 and selection instruction portions 1562 and 1563 are used to select PDF files that are print data as a quality requirement setting target from the file system of the information processing apparatus 110. As described above, a plurality of files can be selected as print data that is the quality requirement setting target. In this case, a print product can be produced using the plurality of files as print data. A file selection portion 1506 is used to select a file to set a quality requirement from the plurality of files selected by the selection portions 1560 and 1561.

When setting a quality requirement for the file selected by the file selection portion 1506, a selection portion 1564 is used to select whether to set a common quality requirement to the entire file or set a quality requirement on a page basis. The page selection portion 1507 is used to set a quality requirement for each page of a file formed by a plurality of pages. The page selection portion 1507 can be used to select a page as a quality requirement setting target. In FIG. 15, the first page is selected in the page selection portion 1507.

The quality requirement set in a state in which the page is selected by the page selection portion 1507 is stored as CustomerItem in quality requirement data in the PRX format. In this case, the page ID of the selected page is stored as the ID of the CustomerItem. Also, if a quality requirement for a specific page is set, Page is set as CustomerItemUnit in the quality requirement data in the PRX format.

On the other hand, the quality requirement set in the state in which the file is selected by the page selection portion 1507 is handled as a quality requirement not for a specific page but for the entire file. In this case as well, the set quality requirement is stored as CustomerItem in the quality requirement data in the PRX format. As the IIS of the CustomerItem, the file ID of the selected file is stored. In the quality requirement data in the PRX format. File is set in the CustomerItemUnit.

As described above, in the quality requirement data, a quality requirement can be set in a data-by-data (for example, file-by-file) basis or in a page-by-page basis. If the quality requirement is set in a page-by-page basis, the quality requirement data stores not only information for specifying a page to which the specific quality requirement is applied but also information representing that the quality requirement is set in a page-by-page basis. If the quality requirement is set in a data-by-data basis, the quality requirement data stores not only information for specifying data to which the specific quality requirement is applied but also information representing that the quality requirement is set in a data-by-data basis.

A master information setting portion 1520 is used to input various kinds of master information needed when creating quality requirement data. The master information can include, for example, a date required by the specifications of PRX, company information, a name according to the requirement specifications defined by PRX, and the like. The master information can be edited by pressing a button 1521.

The overall quality target setting portion 1522 is used to integrate at least one or more quality requirements of different types designated by the quality requirement data and define an overall quality level. The overall quality level is defined by combining a label 1523, a rank 1524, and a value 1525. The label 1523 is readable information added to a quality level. The rank 1524 is quantitative numerical information corresponding to the label 1523. The value 1525 defines a parameter and an equation used to decide the rank 1524.

Taking highest quality 1531 as an example, details of the quality level will be described. The label 1523 of the highest quality 1531 is "Excellent". The character string of the label 1523 can arbitrarily be set by the user, that is, the customer who uses the application. The label 1523 is information provided to allow the operator to discriminate the quality level, and need not always be used for control.

On the other hand, the value of the rank 1524 of the highest quality 1531 is defined as 10. The rank 1524 is a numerical value defined by the customer to quantitatively discriminate and manage the quality of a print product and is defined to be used for control. On the other hand, the value of the rank 1524 can arbitrarily be defined by the customer.

The value 1525 used to define the rank 1524 of the highest quality 1531 is defined as "GT 8". That is, if the value of a quality index calculated in accordance with an equation set by the equation setting portion 1535 to be described later is 8 or more, the rank 1524 of the print product is 10, and the quality of the print product is discriminated as highest quality.

Labels, ranks, and values are similarly defined for other quality levels. The rank and label of a print product are uniquely decided by a value similarly calculated based on the print product. In the example shown in FIG. 15, if the quality index is 7 or more, the quality of the print product is "Good" 1532, and the rank 1524 is discriminated as 8. If the quality index is 6.5 or more, the quality of the print product is "Acceptable" 1533 and the rank 1524 is discriminated as 7. If the quality index is less than 6.5, the quality of the print product is discriminated as "Poor" 1534. If the quality is poor, the rank 1524 need not be set, as shown in FIG. 15. In this embodiment, the information for defining the quality level can be edited using a quality level editing portion 1526.

Note that the number of quality levels is arbitrary. For example, when a level addition portion 1528 is pressed to finely designate quality levels, a new quality level can be added to the overall quality target setting portion 1522. Also, a quality level with a check mark 1546 can be deleted using a level deletion portion 1527.

When the customer makes a quality requirement, a print product acceptance condition can be defined by the numerical value of the rank for the produced print product. The acceptance condition can be set using a setting portion 1529 and a selling portion 1530. The setting portion 1529 is used to define the minimum value of the rank of an acceptable print product. In the example shown in FIG. 15, a quality requirement representing that a print product does not satisfy acceptance quality if the rank evaluated for the print product is less than 8 that is the numerical value defined in the selling portion 1529 can be transmitted to the printing service. In addition, the setting portion 1530 is used to define the minimum value of the rank of a print product to meet the customer's wish. In the example shown in FIG. 15, a quality requirement representing a wish for the rank evaluated for the print product to exceed 9 that is the numerical value defined in the setting portion 1530 can be transmitted to the printing service.

The color quality setting portion 1536 is used to define a quality level concerning the color of a print product. The quality level concerning the color is also defined by combining the label 1523, the rank 1524, and a value 1537, like the overall quality level. As the value 1537, a color difference ($\Delta E$) that is a colorimetric result of a print product with respect to a required color can be designated. In the example shown in FIG. 15, if the color difference is 1.0 or less, the print product is evaluated to have highest quality 1541 (the label 1523 is "Excellent"), and the rank is evaluated as 10. FIG. 15 also shows definitions of "Good" 1542, "Acceptable" 1543, and "Poor" 1544. The quality level concerning the color can also be added or deleted, as in the overall quality target setting portion 1522.

Even for the color quality, the customer can define a print product acceptance condition by the numerical value of the rank, like the overall quality level. The acceptance condition can be set using a setting portion 1538 and a setting portion 1539. The setting portion 1538 is used to define the minimum value of the rank of an acceptable print product concerning the color quality, and the setting portion 1539 is used to define the minimum value of the rank of a print product to meet the customer' wish concerning the color quality. In the example shown in FIG. 15, a quality requirement representing that a print product whose rank evaluated for the color quality is less than 8 does not satisfy the acceptable quality, and representing a wish for the rank to be 10 or more, can be transmitted to the printing service.

A setting portion 1540 is used to designate a variable to be used when referring to the value of the rank concerning the color quality. In the example shown in FIG. 15, a setting is done such that the value of the rank concerning the color quality can be referred to by a variable "cs". This variable is used by the equation setting portion 1535, as will be described later in detail.

The image position deviation quality setting portion 1547 is used to define a quality level concerning the image position deviation of a print product. The quality level concerning the image position deviation is also defined by combining the label 1523, the rank 1524, and a value 1548, like the overall quality level. As the value 1548, the deviation amount of a measurement result of an image position in a print product from a reference position (the length or the distance between a reference image and the image in the print product) can be designated. In the example shown in FIG. 15, if the deviation amount is 0.002 mm or less, the print product is evaluated to have highest quality 1553 (the label 1523 is "Excellent"), and the rank is evaluated as 10. FIG. 15 also shows definitions of Acceptable" 1554 and "Poor" 1555. The quality level concerning the image position deviation can also be added or deleted, as in the overall quality target setting portion 1522.

Even for the image position deviation quality, the customer can define a print product acceptance condition by the numerical value of the rank, like the overall quality level. The acceptance condition can be set using a setting portion 1550 and a setting portion 1551. The setting portion 1550 is used to define the minimum value of the rank of an acceptable print product concerning the image position deviation, and the setting portion 1551 is used to define the minimum value of the rank of a print product to meet the customer's wish concerning the image position deviation. In the example shown in FIG. 15, a quality requirement representing that a print product whose rank evaluated for the image position deviation is less than 5 does not satisfy the acceptable quality, and representing a wish for the rank to be 10 or more, can be transmitted to the printing service.

A setting portion 1552 is used to designate a variable to be used when referring to the value of the rank concerning the image position deviation. In the example shown in FIG. 15, a setting is done such that the value of the rank concerning the image position deviation can be referred to by a variable "rg". This variable is used by the equation setting portion 1535, as will be described later in detail.

The barcode reading quality setting portion 1556 is used to input a quality requirement concerning the reading accuracy of a barcode image printed on a print product. In the example shown in FIG. 15, information different from that in the overall quality target setting portion 1522 is set in the barcode reading quality setting portion 1556. That is, the barcode reading quality is not evaluated using a measurement value, like the color quality and the image position deviation quality, but can be evaluated depending on whether barcode information is readable. A setting portion 1557 can be used to set whether to perform barcode reading inspection. A setting portion 1559 can be used to designate the position of the barcode as the inspection target by coordinates.

A setting portion 1558 is used to designate a variable to be used when referring to an evaluation value concerning the barcode reading quality. In the example shown in FIG. 15, a setting is done such that the evaluation value concerning the barcode reading quality can be referred to by a variable "bc". Here, the evaluation value is 1 if the barcode can be read, or 0 if the barcode cannot be read. This variable is used by the equation setting portion 1535, as will be described later in detail.

The equation setting portion 1535 is used to define an equation to be used to integrate the color quality, the image position deviation quality, and the barcode reading quality and quantitatively obtain an overall quality index. More specifically, using the equation set using the equation setting portion 1535, a value representing an overall quality index can be calculated from the rank of color quality, the rank of image position deviation quality, and the evaluation value of barcode reading quality.

As the equation expression method, various methods can be employed. In this embodiment, the equation is expressed by a Lambda expression. As an example, consider a case in which quality report data created by the workflow control program 505 includes the following information based on a reference indicated by quality requirement data.

Color quality measurement value (ΔE): 1.5 (cs=9)

Image position deviation quality measurement value (mm): 0.002 (rg=10)

Barcode reading quality measurement value (reading success/failure) success (bc=1)

In this case, when the equation set in the equation setting portion 1535 in FIG. 15 is used, a value representing the overall quality index can be calculated as follows.

$$bc \times (cs + rg \times 4)/5 = 1 \times (9 + 10*4)/5 = 9.8$$

That is, since the value 1525 is 9.8, it is evaluated according to the settings in the overall quality target setting portion 1522 that the overall quality is the highest quality 1531, the rank 1524 is 10, and the label 1523 is "Excellent".

As another equation expression method, a method of expressing an anonymous function in accordance with the format of an arbitrary programming language or script language can be used. Also, a function need not be used to derive the overall quality index, and the programming language or script language may be described such that the value of the quality index can be obtained by executing programming or script by the application program. Furthermore, a name may be given to the equation defined by another method, and the name may be set in the equation setting portion 1535.

When the setting of the quality standard is completed, the user can press a button 1565. When the button 1565 is pressed, quality requirement data is created based on the set quality standard. On the other hand, to cancel the set quality standard, the user can press a button 1566.

Figure 13:
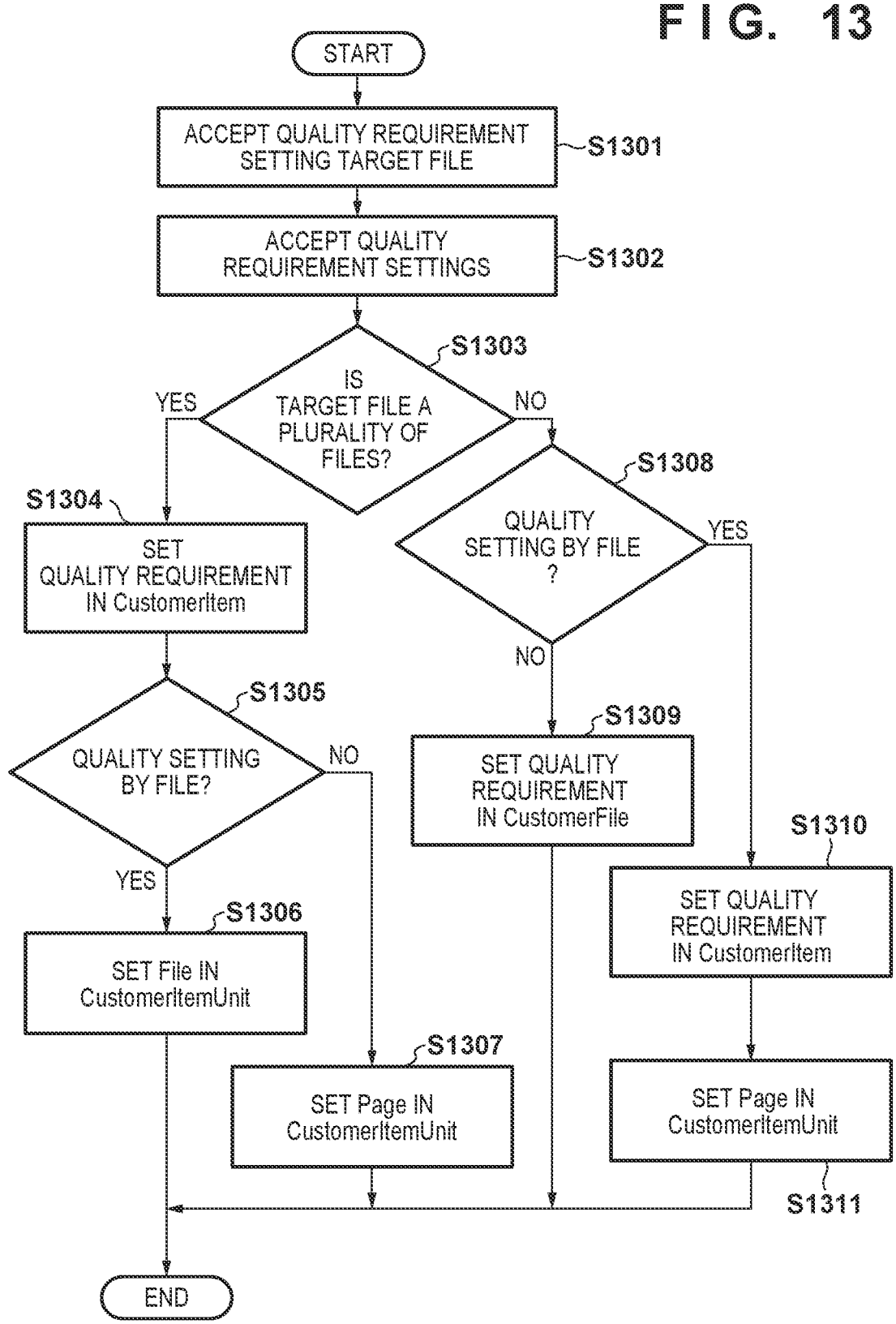
FIG. 13 shows an example of a flowchart for creating quality requirement data.

FIG. 13 is a flowchart of the processing of the data creation application unit 703 to generate quality requirement data in the PRX format in accordance with the quality standard set using the user interface shown in FIG. 15. The quality requirement data created by the data creation application unit 703 includes information representing a quality requirement for a print product based on print data in a data-by-data basis or in a page-by-page basis, and this corresponds to the above-described CustomerItem. In addition, the quality requirement data created by the data creation application unit 703 includes information for specifying whether the quality requirement is defined in a data-by-data basis or in a page-by-page basis, and this corresponds to the above-described CustomerItemUnit.

In step S1301, the data creation application unit 703 accepts a designation of print data as a quality requirement setting target by the user. In step S1302, the data creation application unit 703 accepts setting of a quality requirement by the user.

In step S1303, the data creation application unit 703 determines whether a plurality of files are designated as print data in step S1301. As a result, if a plurality of files are designated, the process advances to step S1304. If a single file is designated, the process advances to step S1308.

In step S1304, the data creation application unit 703 stores the quality requirement set in step S1302 in the CustomerItem of the quality requirement data in the PRX format. At this time, the data creation application unit 703 can record the ID of the print data or page to which the quality requirement is applied as the ID of the CustomerItem. The ID of print data may be, fix example, the ID of a PDF file or may be an ID (PRX ID) recorded in the metadata of the file and used to identify quality requirement data. Also, the ID of a page may be a page number, may be an ID assigned to each page in print data, or may be an ID (PRX ID) recorded in the metadata of print data and used to identify quality requirement data for each page.

In step S1305, the data creation application unit 703 determines whether the quality requirement set in step S1302 is a quality requirement for each file or a quality requirement for each page. If a quality requirement for each file is set, the process advances to step S1306, and the data creation application unit 703 sets File in the CustomerItemUnit of the quality requirement data in the PRX format. In this case, data in the PRX format as shown in FIG. 12A is obtained. Referring to FIG. 12A, File is set in CustomerItemUnit 1201. In this case, a quality requirement is set in a file-by-file basis in the quality requirement data. In the example shown in FIG. 12A, CustomerItem 1210 indicates a quality requirement for one print data (for example, a PDF file), and CustomerItem 1220 similarly indicates a quality requirement for one print data (for example, a PDF file). By referring to the CustomerItemUnit 1201, the workflow control unit 707 and the image forming apparatus 104 can discriminate that IDs 1211 and 1221 of the CustomerItems 1210 and 1220 are the IDs of the files. Here, one quality requirement (for example, CustomerItem) may represent a quality requirement common to two or more specific print data.

If it is determined, in step S1305, that a quality requirement for each page is set, the process advances to step S1307, and the data creation application unit 703 sets Page in the CustornerItemUnit of the quality requirement data in the PRX format. In this case, data in the PRX format as shown in FIG. 12B is obtained. Referring to FIG. 12B, Page is set in CustomerItemUnit 1251. In this case, a quality requirement is set in a page-by-page basis in the quality requirement data. In the example shown in FIG. 12B, CustomerItem 1260 indicates a quality requirement for one page, and CustomerItem 1270 similarly indicates a quality requirement for one page. By referring to the CustomerItemUnit 1251, the workflow control unit 707 and the image forming apparatus 104 can discriminate that IDs 1261 and 1271 of the CustomerItems 1260 and 1270 are the IDs of the pages. Here, one quality requirement (for example, CustomerItem) may represent a quality requirement common to two or more specific pages.

On the other hand, if it is determined, in step S1303, that a single file is designated, in step S1308, the data creation application unit 703 determines whether the quality requirement set in step S1302 is a quality requirement for each file or a quality requirement for each page. If a quality requirement for each file is set, the process advances to step S1309, and the data creation application unit 703 stores the quality requirement set in step S1302 in CustomerFile of the quality requirement data in the PRX format. In this case, a quality requirement common to the entire print data is set.

If it is determined, in step S1308, that a quality requirement for each page is set, the process advances to step S1310. In step S1310, the data creation application unit 703 stores the quality requirement set in step S1302 in CustomerItem of the quality requirement data in the PRX format. Also, in step S1311, the data creation application unit 703 sets Page in the CustomerItemUnit of the quality requirement data in the PRX format. In this case as well, a quality requirement is set in a page-by-page basis in the quality requirement data.

As shown in FIGS. 12A and 12B, the quality requirement data may have a data structure including first information representing a quality requirement, second information representing the application destination of the quality requirement, and third information for specifying the definition unit of the quality requirement. In particular, the first information can indicate a plurality of quality requirements (for example, CustomerItem) for a print product based on print data of a plurality of pages. Also, the second information can indicate the ID of print data or a page, which is the application destination of a quality requirement, for each of a plurality of quality requirements. Furthermore, the third information can specify whether the quality requirement is defined in a data-by-data basis or defined in a page-by-page basis. Here, the third information (for example, CustomerItemUnit) is common to the plurality of quality requirements. For example, in FIG. 12A, the CustomerItemUnit 1201 is common to the CustomerItems 1210 and 1220. The third information is used for processing in which a computer (for example, the information processing apparatus 102) that performs control to inspect a print product based on print data in accordance with quality requirements determines print data or a page to which each of the plurality of quality requirements is applied.

FIG. 11 shows an example of a screen of an application to be executed in the information processing apparatus 110 when submitting print data, a job ticket, and quality requirement data to the printing service system 100. The screen shown in FIG. 11 can be displayed on the web browser 604. That is, when the user inputs the address of the web service provided by the web server 504 that is the data transmission destination to an address input portion 1111 of a user interface 1110 of the web browser 604, a submission screen 1112 is displayed.

In a designation portion 1113, a PDF file that is print data to be submitted to the printing service system 100 is designated. Using a selection portion 1114, the user can select print data from a file system provided in the information processing apparatus 110. Similarly, in a designation portion 1115 and a designation portion 1117, a JDF file that is a job ticket to be sent to the printing service system 100 and an PRX file that is quality requirement data are designated, respectively. Using a selection portion 1116 and a selection portion 1118, the user can select a job ticket and quality requirement data from the file system provided in the information processing apparatus 110.

A data set to be transmitted to the printing service system 100 is thus designated. When a transmission instruction portion 1121 is selected in a state in which an appropriate transmission destination is set, the designated data set is transmitted to the printing service system 100. A processing stop instruction portion 1122 is used by the user to stop submission processing.

Figure 14:
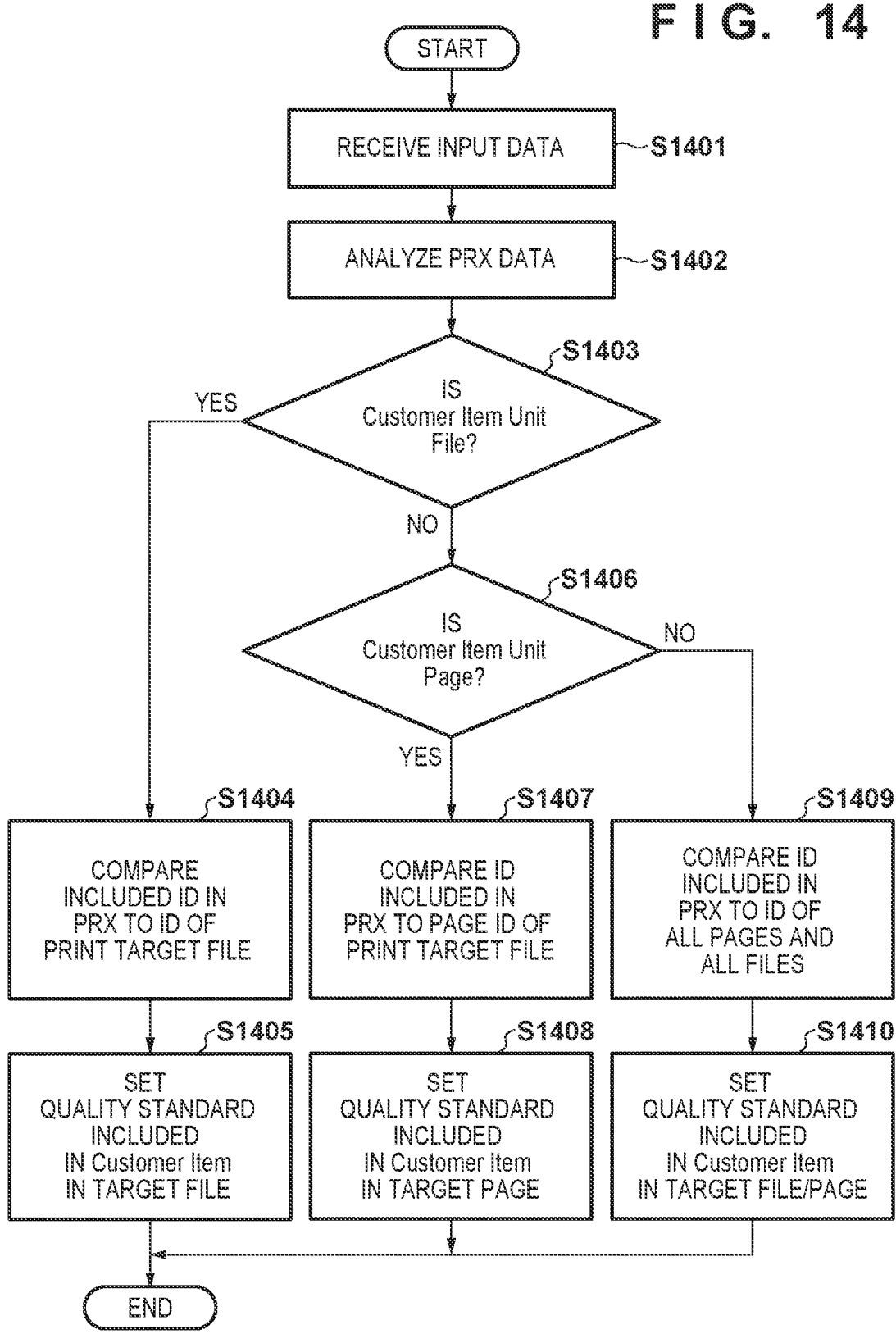
FIG. 14 shows an example of a flowchart when applying the quality requirement data.

FIG. 14 is a flowchart of quality requirement application processing to be performed by the workflow control unit 707 in accordance with quality requirement data in the PRX format transmitted from the customer system 109. In step S1401, the workflow control unit 707 acquires quality requirement data in the PRX format edited in the customer system 109 and print data in the PDF format in accordance with the flowchart shown in FIG. 13.

In step S1402, the workflow control unit 707 analyzes the quality requirement data. In step S1403, the workflow control unit 707 determines whether File is set in CustomerItemUnit. Upon judging that File is set, the process advances to step S1404. Upon judging that File is not set, the process advances to step S1405.

Step S1404 is performed when a quality requirement is defined in a data-by-data basis. The workflow control unit 707 determines to apply the quality requirement to print data having an ID associated with information representing the quality requirement. More specifically, in step S1404, the workflow control unit 707 compares an ID included in the CustomerItem of the quality requirement data with the file ID of the PDF file acquired in step S1401. In step S1405, the workflow control unit 707 registers the print job of the PDF file acquired in step S1401. Here, the workflow control unit 707 registers the print job for printing print data having the ID included in the CustomerItem such that print settings and inspection processing for satisfying the quality requirement described in the CustomerItem are registered. Note that the quality requirement data can include a plurality of CustomerItems, as described above, and the processes of steps S1404 and S1405 can be performed for each CustomerItem. Note that if a quality requirement is stored in CustomerFile, the workflow control unit 707 can register the print job for printing print data such that print settings and inspection processing for satisfying the quality requirement are registered.

In step S1406, the workflow control unit 707 determines whether Page is set in CustomerItemUnit. Upon judging that Page is set, the process advances to step S1407. Upon judging that Page is not set, the process advances to step S1409.

Step S1407 is performed when a quality requirement is defined in a page-by-page basis. The workflow control unit 707 determines to apply the quality requirement to a page having an ID associated with information representing the quality requirement in the print data. More specifically, in step S1407, the workflow control unit 707 compares the ID included in the CustomerItem of the quality requirement data with the page ID of the PDF file acquired in step S1401. In step S1408, the workflow control unit 707 registers the print job of the PDF file acquired in step S1401. Here, the workflow control unit 707 registers the print job such that print settings and inspection processing for satisfying the quality requirement described in the CustomerItem are applied when printing the page having the ID included in the CustomerItem. Note that the processes of steps S1407 and S1408 can be performed for each CustomerItem.

In step S1409, the workflow control unit 707 compares the ID included in the CustomerItem of the quality requirement data with the file ID and the page ID of the PDF file acquired in step S1401. In step S1410, the workflow control unit 707 registers the print job of the PDF file acquired in step S1401. Here, the workflow control unit 707 registers the print job such that print settings and inspection processing for satisfying the quality requirement described in the CustomerItem are applied when printing the file or the page having the ID included in the CustomerItem. Note that the processes of steps S1409 and S1410 can be performed for each CustomerItem.

According to the above-described method, the printing service can discriminate whether the quality requirement shown by the quality requirement data is designated in a data-by-data (file-by-file) basis or designated in a page-by-page basis. With this configuration, when producing a print product based on a plurality of print data including a plurality of pages, even if a plurality of quality standards are defined, the ID of one of the print data and the page and the ID of the application destination of the quality standard are compared, thereby determining the application destination of the quality standard. According to this configuration, the processing efficiency can be improved as compared to a case in which both the IDs of all print data and the page IDs are compared with the ID of the application destination of the quality standard included in the quality requirement data.

Note that the method of determining the application destination of the quality standard based on the information for specifying whether the quality requirement is defined in a data-by-data basis or in a page-by-page basis, such as CustomerItemUnit, is not limited to the above-described method. For example, information (for example, Mix or Job/Page) representing that both the definition of the quality requirement in a data-by-data basis and the definition of the quality requirement in a page-by-page basis exist may be registered in the CustomerItemUnit. If such information is registered in the CustomerItemUnit, or if neither File nor Page is registered in the CustomerItemUnit, the workflow control unit 707 can perform the following processing in step S1409. For example, the workflow control unit 707 first compares the ID included in the CustomerItem of the quality requirement data with the file ID of a PDF file. If a PDF file having a file ID that matches the ID included in the Cus-tomerItem is found, the workflow control unit 707 determines to apply the quality requirement to the PDF file. On the other hand, if such a PDF file is not found, the workflow control unit 707 compares the ID included in the Custom-erItem of the quality requirement data with the page ID of the PDF file for which it is determined that another quality requirement is to be applied immediately before. The workflow control unit 707 then determines to apply the quality requirement to a page having a page ID that matches the ID included in the CustomerItem, the page being of the PDF file for which it is determined that another quality requirement is to be applied immediately before. The workflow control unit 707 can register the print job such that the quality requirement is applied to the determined application destination. Note that this processing can be performed for each CustomerItem in a defined order.

The data creation application unit 703 may create quality requirement data such that the workflow control unit 707 can perform the above-described processing. For example, the data creation application unit 703 can create quality requirement data that includes a quality requirement of print data and a quality requirement of another print data for a specific page of this print data in this order (for example, as CustomerItem). Also, in this case, the data creation application unit 703 can register, in the CustomerItemUnit of the quality requirement data, information representing that both the definition of the quality requirement in a data-by-data basis and the definition of the quality requirement in a page-by-page basis exist.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-137026, filed Aug. 14, 2020, which is here incorporated by reference herein in its entirety.

What is claimed is:

1. An information processing apparatus comprising at least one processor and at least one memory storing a program which is configured to cause the at least one processor to perform:
acquiring print data of a plurality of pages;
generating quality requirement data including information indicating a quality requirement for a print product based on the print data in a data-by-data basis or in a page-by-page basis, and information for specifying whether the quality requirement is defined in the data-by-data basis or defined in the page-by-page basis; and
transmitting the print data and the quality requirement data to a printing service for a print request,
wherein the quality requirement data is a file in a PRX format, and
wherein the file in the PRX format stores, as CustomerItem, the quality requirement in the data-by-data basis or in the page-by-page basis.

2. The apparatus according to claim 1, wherein the transmitting comprises transmitting two or more print data and one quality requirement data representing the quality requirement for the two or more.

3. The apparatus according to claim 2, wherein the one quality requirement data includes one piece of information for specifying whether the quality requirement is defined in the data-by-data basis or defined in the page-by-page basis, which is common to a plurality of quality requirements.

4. The apparatus according to claim 1, wherein the transmitting comprises transmitting print setting data representing a print setting for the print data.

5. The apparatus according to claim 1, wherein the file in the PRX format stores, as CustomerItemUnit, the information for specifying whether the quality requirement is defined in the data-by-data basis or defined in the page-by-page basis.

6. The apparatus according to claim 1, wherein the information representing the quality requirement of the print product in the data-by-data basis or in the page-by-page basis includes information representing an ID of one of the print data and the page, to which the quality requirement is applied.

7. The apparatus according to claim 1, wherein one print data is one file representing an image.

8. The apparatus according to claim 7, wherein the file representing the image is a file in a PDF format.

9. The apparatus according to claim 1, wherein the program is further configured to cause the at least one processor to control displaying, on a screen, a user interface including a setting portion configured to set the quality requirement, and a designation portion configured to designate one of the print data and the page to which the quality requirement is applied,
 wherein the generating comprises generating the quality requirement data based on a user instruction on the user interface.

10. An information processing apparatus comprising at least one processor and at least one memory storing a program which is configured to cause the at least one processor to perform:
 acquiring quality requirement data including information indicating a quality requirement for a print product based on print data of a plurality of pages in a data-by-data basis or in a page-by-page basis, and information for specifying whether the quality requirement is defined in the data-by-data basis or defined in the page-by-page basis, which is common to a plurality of quality requirements;
 determining one of print data or a page, to which the plurality of quality requirements are applied, by processing according to the information for specifying whether the quality requirement is defined in the data-by-data basis or defined in the page-by-page basis; and
 instructing, in accordance with a result of the determining one of the print data or the page, an inspection apparatus to perform inspection according to the quality requirement for the print product based on the print data,
 wherein the quality requirement data is a file in a PRX format, and
 wherein the file in the PRX format stores, as CustomerItem, the quality requirement in the data-by-data basis or in the page-by-page basis.

11. The apparatus according to claim 10, wherein
 the determining comprises, upon determining that the quality requirement is defined in the data-by-data basis, determining to apply the quality requirement to print data having an ID associated with the information indicating the quality requirement, and
 the determining comprises, upon determining that the quality requirement is defined in the page-by-page basis, determining to apply the quality requirement to a page having an ID associated with the information indicating the quality requirement in the print data.

12. A printing system comprising an information processing apparatus of a customer, an information processing apparatus of a printing service, a printing apparatus, and an inspection apparatus,
 wherein the information processing apparatus of the customer comprises at least one processor and at least one memory storing a program which is configured to cause the at least one processor to perform:
  acquiring print data of a plurality of pages;
  generating quality requirement data including information indicating a quality requirement for a print product based on the print data in a data-by-data basis or in a page-by-page basis, and information for specifying whether the quality requirement is defined in the data-by-data basis or defined in the page-by-page basis; and
 transmitting the print data and the quality requirement data to the information processing apparatus of the printing service, and
 the information processing apparatus of the printing service comprises at least one processor and at least one memory storing a program which is configured to cause the at least one processor to perform:
  acquiring the print data and the quality requirement data;
  determining one of print data or a page, to which the quality requirement is applied, by processing according to the information for specifying whether the quality requirement is defined in the data-by-data basis or defined in the page-by-page basis; and
  instructing the printing apparatus to perform printing based on the print data and instructing, in accordance with a result of the determining one of the print data or the page, the inspection apparatus to perform inspection according to the quality requirement for the print product based on the print data,
 wherein the quality requirement data is a file in a PRX format, and
 wherein the file in the PRX format stores, as CustomerItem, the quality requirement in the data-by-data basis or in the page-by-page basis.

13. An information processing method comprising:
 acquiring print data of a plurality of pages;
 generating quality requirement data including information indicating a quality requirement for a print product based on the print data in a data-by-data basis or in a page-by-page basis, and information for specifying whether the quality requirement is defined in the data-by-data basis or defined in the page-by-page basis; and
 transmitting the print data and the quality requirement data to a printing service for a print request,
 wherein the quality requirement data is a file in a PRX format, and
 wherein the file in the PRX format stores, as CustomerItem, the quality requirement in the data-by-data basis or in the page-by-page basis.

14. An information processing method comprising:
 acquiring quality requirement data including information indicating a quality requirement for a print product based on print data of a plurality of pages in a data-by-data basis or in a page-by-page basis, and information for specifying whether the quality requirement is defined in the data-by-data basis or defined in the page-by-page basis, which is common to a plurality of quality requirements;
 determining one of print data or a page, to which the plurality of quality requirements are applied, by processing according to the information for specifying whether the quality requirement is defined in the data-by-data basis or defined in the page-by-page basis; and
 instructing, in accordance with a result of the determining one of the print data or the page, an inspection apparatus to perform inspection according to the quality requirement for the print product based on the print data, wherein the quality requirement data is a file in a PRX format, and wherein the file in the PRX format stores, as Customer-Item, the quality requirement in the data-by-data basis or in the page-by-page basis.

15. A printing method comprising:

acquiring print data of a plurality of pages at an information processing apparatus of a customer;

generating quality requirement data including information indicating a quality requirement for a print product based on the print data in a data-by-data basis or in a page-by-page basis, and information for specifying whether the quality requirement is defined in the data-by-data basis or defined in the page-by-page basis;

transmitting the print data and the quality requirement data to an information processing apparatus of a printing service;

acquiring the transmitted print data and the quality requirement data at the information processing apparatus of the printing service;

determining one of print data or a page, to which the quality requirement is applied, by processing according to the information for specifying whether the quality requirement is defined in the data-by-data basis or defined in the page-by-page basis; and instructing a printing apparatus to perform printing based on the print data and instructing, in accordance with a result of the determining one of the print data or the page, an inspection apparatus to perform inspection according to the quality requirement for the print product based on the print data, wherein the quality requirement data is a file in a PRX format, and wherein the file in the PRX format stores, as Customer-Item, the quality requirement in the data-by-data basis or in the page-by-page basis.

16. A non-transitory computer-readable medium storing a program which causes a computer to perform:

acquiring print data of a plurality of pages;

generating quality requirement data including information indicating a quality requirement for a print product based on the print data in a data-by-data basis or in a page-by-page basis, and information for specifying whether the quality requirement is defined in the data-by-data basis or defined in the page-by-page basis; and transmitting the print data and the quality requirement data to a printing service for a print request, wherein the quality requirement data is a file in a PRX format, and wherein the file in the PRX format stores, as Customer-Item, the quality requirement in the data-by-data basis or in the page-by-page basis.

17. A non-transitory computer-readable medium storing a program which causes a computer to perform:

acquiring quality requirement data including information indicating a quality requirement for a print product based on print data of a plurality of pages in a data-by-data basis or in a page-by-page basis, and information for specifying whether the quality requirement is defined in the data-by-data basis or defined in the page-by-page basis, which is common to a plurality of quality requirements;

determining one of print data or a page, to which the plurality of quality requirements are applied, by processing according to the information for specifying whether the quality requirement is defined in the data-by-data basis or defined in the page-by-page basis; and instructing, in accordance with a result of the determining one of the print data or the page, an inspection apparatus to perform inspection according to the quality requirement for the print product based on the print data, wherein the quality requirement data is a file in a PRX format, and wherein the file in the PRX format stores, as Customer-Item, the quality requirement in the data-by-data basis or in the page-by-page basis.

* * * * *